US011392089B2

(12) United States Patent
Lee et al.

(10) Patent No.: US 11,392,089 B2
(45) Date of Patent: Jul. 19, 2022

(54) MULTI-IMAGE DISPLAY APPARATUS USING HOLOGRAPHIC PROJECTION

(71) Applicant: SAMSUNG ELECTRONICS CO., LTD., Suwon-si (KR)

(72) Inventors: Changkun Lee, Seoul (KR); Wontaek Seo, Yongin-si (KR); Geeyoung Sung, Daegu (KR); Bongsu Shin, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 16/813,905

(22) Filed: Mar. 10, 2020

(65) Prior Publication Data
US 2021/0072701 A1 Mar. 11, 2021

(30) Foreign Application Priority Data

Sep. 9, 2019 (KR) .......................... 10-2019-0111556

(51) Int. Cl.
| | |
|---|---|
| *G03H 1/26* | (2006.01) |
| *G02B 5/32* | (2006.01) |
| *G03H 1/00* | (2006.01) |
| *G03H 1/22* | (2006.01) |

(52) U.S. Cl.
CPC .................. *G03H 1/26* (2013.01); *G02B 5/32* (2013.01); *G03H 2001/0088* (2013.01); *G03H 2001/2231* (2013.01)

(58) Field of Classification Search
None
See application file for complete search history.

(56) References Cited

U.S. PATENT DOCUMENTS

| | | | |
|---|---|---|---|
| 8,711,455 B2 | 4/2014 | Song et al. | |
| 10,054,793 B2 | 8/2018 | An et al. | |
| 10,613,332 B1* | 4/2020 | Holmes | .................... G06F 3/013 |
| 2013/0308339 A1 | 11/2013 | Woodgate et al. | |
| 2018/0129166 A1 | 5/2018 | Seo et al. | |

(Continued)

FOREIGN PATENT DOCUMENTS

| | | |
|---|---|---|
| CN | 108072976 A | 5/2018 |
| EP | 3321746 A1 | 5/2018 |

(Continued)

OTHER PUBLICATIONS

Communication dated Feb. 17, 2021, issued by the European Patent Office in European Application No. 20194816.3.

*Primary Examiner* — Jennifer D. Carruth
(74) *Attorney, Agent, or Firm* — Sughrue Mion, PLLC

(57) ABSTRACT

Provided a display apparatus including a light source configured to emit illumination light, a display panel configured to generate an image based on the illumination light, an image processor configured to provide image data to the display panel to cause the display panel to generate a first image and a second image which travel in different directions, and an optical system configured to separate the first image and the second image displayed on the display panel, wherein the image processor is further configured to provide the display panel with composite image data obtained by adding first image data to which a first phase profile is applied and second image data to which a second phase profile different from the first phase profile is applied.

35 Claims, 21 Drawing Sheets

(56) References Cited

U.S. PATENT DOCUMENTS

2018/0246325 A1* 8/2018 Frisken .............. G02B 27/0103
2019/0324272 A1 10/2019 Seo et al.

FOREIGN PATENT DOCUMENTS

| KR | 10-1759252 B1 | 7/2017 |
| KR | 10-2018-0052357 A | 5/2018 |
| KR | 10-1965785 B1 | 4/2019 |
| KR | 10-2019-0123515 A | 11/2019 |
| WO | 2004/106983 A2 | 12/2004 |
| WO | 2018/175653 A1 | 9/2018 |

* cited by examiner

MULTI-IMAGE DISPLAY APPARATUS USING HOLOGRAPHIC PROJECTION

CROSS-REFERENCE TO RELATED APPLICATION

This application claims priority from Korean Patent Application No. 10-2019-0111556, filed on Sep. 9, 2019 in the Korean Intellectual Property Office, the disclosure of which is incorporated herein in its entirety by reference.

BACKGROUND

1. Field

Example embodiments of the present disclosure relate to multi-image display apparatuses, such as an augmented reality (AR) system, and more particularly, to a multi-image display apparatus configured to provide a plurality of images to one display panel by using a holographic projection scheme.

2. Description of Related Art

Recently, there has been an increased interest in the development of electronic devices and display apparatuses for virtual reality (VR). Techniques capable of implementing augmented reality (AR) and mixed reality (MR) as the next stage of VR have been studied.

AR, unlike VR assuming a complete virtual world, is a display technology for showing a virtual object or information in an overlapping manner in a real-world environment, further enhancing the effect of reality. While VR is only applicable to the field of games or virtual experiences, AR is applicable to various real environments. In particular, such AR draws the attention as a next generation display technology suitable for a ubiquitous environment or an Internet of things (IoT) environment. AR may be an example of MR in that it shows the real world and additional information (that is, the virtual world) in a mixed manner.

In order to provide binocular parallax to an observer, express multiple depths, extend a viewing angle, or expand the field of view in a VR system, an AR system, or an MR system, a method of using two or more display panels in a space division manner or a time division manner has been proposed.

SUMMARY

According to an aspect of an example embodiment, there is provided a display apparatus including a light source configured to emit illumination light, a display panel configured to generate an image based on the illumination light, an image processor configured to provide image data to the display panel to cause the display panel to generate a first image and a second image which travel in different directions, and an optical system configured to separate the first image and the second image displayed on the display panel, wherein the image processor is further configured to provide the display panel with composite image data obtained by adding first image data to which a first phase profile is applied and second image data to which a second phase profile different from the first phase profile is applied.

The optical system may include a first mirror configured to reflect the first image in a first direction, and a second mirror configured to reflect the second image in a second direction that is different from the first direction.

The display panel may include a reflective spatial light modulator configured to generate the image by reflecting the illumination light, wherein the optical system may further include a Fourier lens configured to focus the first image on the first mirror and the second image on the second mirror, a beam splitter configured to provide the display panel with the illumination light emitted from the light source and to provide the Fourier lens with the image generated by the display panel, and a collimating lens configured to collimate the illumination light emitted from the light source and incident on the beam splitter to parallel light.

The optical system may further include a light shielding member configured to block light generated by zero-order diffraction in the display panel.

The light shielding member may be provided on a focal plane of the Fourier lens on an optical axis of the Fourier lens, and the first mirror and the second mirror may be respectively provided on each side of the light shielding member on the focal plane of the Fourier lens.

The display panel may include a transmissive spatial light modulator configured to transmit the illumination light and generate the image, wherein the optical system further may include a collimating lens configured to collimate the illumination light emitted from the light source and incident on the display panel to parallel light, and a Fourier lens configured to focus the first image on the first mirror and focus the second image on the second mirror, the Fourier lens being provided to face a light exit surface of the display panel.

The optical system may include a first light guide plate configured to guide the first image to a first space, and a second light guide plate configured to guide the second image to a second space that is different from the first space.

The first light guide plate may include a first input coupler configured to guide the first image to an inside of the first light guide plate, and a first output coupler configured to output the first image from the first light guide plate to an outside of the first light guide plate, and the second light guide plate may include a second input coupler configured to guide the second image to an inside of the second light guide plate, and a second output coupler configured to output the second image from the inside of the first light guide plate to an outside of the second light guide plate.

The optical system may further include a Fourier lens configured to focus the first image and the second image, respectively, wherein the first input coupler is provided at a first position where the first image is focused by the Fourier lens, and the second input coupler is provided at a second position where the second image is focused by the Fourier lens.

An area of the first output coupler may be larger than an area of the first input coupler, and an area of the second output coupler may be larger than an area of the second input coupler.

The optical system may further include a light shielding member configured to block light generated by zero-order diffraction in the display panel, and the first light guide plate and the second light guide plate may be provided on each side of the light shielding member, respectively.

The first image may be an image for a left eye of an observer and the second image may be an image for a right eye of the observer.

The optical system may include a first optical member configured to reflect or transmit the first image to a first space, and a second optical member configured to reflect or transmit the second image to a second space that is different from the first space.

The first optical member and the second optical member may include semi-transmissive mirrors or holographic optical elements (HOEs).

The optical system may further include a Fourier lens configured to focus the first image and the second image, respectively, and a light shielding member configured to block light generated by zero-order diffraction in the display panel, wherein the first optical member and the second optical member may be provided farther from the Fourier lens than a focal length of the Fourier lens, wherein the light shielding member may be provided on a focal plane of the Fourier lens on an optical axis of the Fourier lens, and wherein the first optical member and the second optical member may be provided in opposite directions at each side of the light shielding member, respectively.

The optical system may include an optical member configured to reflect or transmit the first image and the second image such that the second image is shifted with respect to the first image.

The optical system may further include a Fourier lens configured to focus the first image and the second image, respectively, and the optical member may be provided farther from the Fourier lens than a focal length of the Fourier lens.

A viewpoint information of the first image may be different from a viewpoint information of the second image.

The display apparatus of claim 1, wherein the optical system may include a first light guide plate configured to guide the first image to a space at a first angle range, and a second light guide plate configured to guide the second image to a space at a second angle range that is different from the first angle range.

The first light guide plate may include a first input coupler configured to guide the first image to an inside of the first light guide plate, and a first output coupler configured to output the first image from the inside of the first light guide plate to an outside of the first light guide plate, and the second light guide plate may include a second input coupler configured to guide the second image to an inside of the second light guide plate, and a second output coupler configured to output the second image from the inside of the second light guide plate to an outside of the second light guide plate, and the first output coupler and the second output coupler may overlap each other such that the first image output through the first output coupler passes through the second output coupler of the second light guide plate.

The first input coupler and the second input coupler may be provided not to overlap each other such that the first image is incident only on the first input coupler and the second image is incident only on the second input coupler.

The optical system may further include a light shielding member provided between the first input coupler and the second input coupler and configured to block light generated by zero-order diffraction in the display panel.

The image processor may be further configured to provide the display panel with composite image data obtained by adding third image data to which a third phase profile different from the first phase profile and the second phase profile, respectively, is applied and fourth image data to which a fourth phase profile different from the first phase profile, the second phase profile, and the third phase profile, respectively, is applied to each of the first image data and the second image data, wherein the display panel may be further configured to generate the first image, the second image, a third image, and a fourth image that travel in different directions.

The first image and the third image may be images for a right eye of an observer, a viewpoint information of the first image being different from a viewpoint information of the second image, and the second image and the fourth image may be images for a left eye of the observer, a viewpoint information of the second image being different from a viewpoint information of the fourth image.

The optical system may include a first optical member configured to reflect or transmit the first image and the third image such that the third image is shifted with respect to the first image, and a second optical member configured to reflect or transmit the second image and the fourth image such that the fourth image is shifted with respect to the second image.

The optical system may include a first light guide plate configured to guide the first image to a first space at a first angle range, a second light guide plate configured to guide the second image to a second space that is different from the first space at the first angle range, a third light guide plate configured to guide the third image to the first space at a second angle range that is different from the first angle range, and a fourth light guide plate configured to guide the fourth image to the second space at the second angle range.

The first light guide plate may include a first input coupler configured to guide the first image to an inside of the first light guide plate, and a first output coupler configured to output the first image from the inside of the first light guide plate to an outside of the first light guide plate, the second light guide plate may include a second input coupler configured to guide the second image to an inside of the second light guide plate, and a second output coupler configured to output the second image from the inside of the second light guide plate to an outside of the second light guide plate, the third light guide plate may include a third input coupler configured to guide the third image to an inside of the third light guide plate, and a third output coupler configured to output the third image from the inside of the third light guide plate to outside of the third light guide plate, and the fourth light guide plate may include a fourth input coupler configured to guide the fourth image to an inside of the fourth light guide plate, and a fourth output coupler configured to output the fourth image from the inside of the fourth light guide plate to outside of the fourth light guide plate, wherein the first output coupler and the third output coupler overlap each other such that the first image output through the first output coupler passes through the third output coupler of the third light guide plate, and wherein the second output coupler and the fourth output coupler overlap each other such that the second image output through the second output coupler passes through the fourth output coupler of the fourth light guide plate.

The optical system may further include a light shielding member configured to block light generated by zero-order diffraction in the display panel, wherein the first light guide plate and the third light guide plate are provided on a first side of the light shielding member, and the second light guide plate and the fourth light guide plate are provided on a second side of the light shielding member.

The optical system may include a first light guide plate configured to project the first image at a first depth on a space, and a second light guide plate configured to project the second image at a second depth on the space, the second depth being different from the first depth.

The first light guide plate may include a first input coupler configured to guide the first image to an inside of the first light guide plate, and a first output coupler configured to output the first image from the inside of the first light guide plate to outside of the first light guide plate, and the second light guide plate may include a second input coupler configured to guide the second image to an inside of the second light guide plate, and a second output coupler configured from the inside of the second light guide plate to output the second image to outside of the second light guide plate, wherein the first output coupler and the second output coupler overlap each other such that the first image output through the first output coupler passes through the second output coupler of the second light guide plate.

The optical system may include an optical member configured to reflect or transmit the first image and the second image such that the second image is provided at a center of the first image and the first image is provided to surround a periphery of the second image.

The first image and the second image may be combined to form a single image, wherein an angle of view of the second image is smaller than an angle of view of the first image, and wherein a resolution of the second image is higher than a resolution of the first image.

The image processor may be further configured to generate the first phase profile such that the first image is focused at a first focal length and to generate the second phase profile such that the second image is focused at a second focal length that is greater than the first focal length, and wherein the first focal length may be less than a distance between the display panel and the optical member and the second focal length may be greater than the distance between the display panel and the optical member.

The optical system may include a first lens configured to focus the first image and the second image, respectively, a second lens provided at a focal point of the second image formed by the first lens, the second lens configured to reduce a divergence angle of the second image, a light shielding member configured to block light generated by zero-order diffraction in the display panel, and an optical member configured to converge the first image and the second image at a same point.

The display apparatus may include a virtual reality (VR) display apparatus, an augmented reality (AR) display apparatus, or a mixed reality (MR) display apparatus, which is configured as a head mounted-type apparatus, a glass-type apparatus, or a goggle-type apparatus.

According to another aspect of an example embodiment, there is provided a display apparatus including a light source configured to emit light, a display panel configured to generate an image based on the light, an image processor configured to provide composite image data, obtained by adding first image data to which a first phase profile is applied and second image data to which a second phase profile different from the first phase profile is applied, to the display panel to cause the display panel to simultaneously display a first holographic image that travels in a first direction and a second holographic image that travels in a second direction that is different from a first direction, and an optical system configured to separate the first image and the second image displayed on the display panel.

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Figure 1:
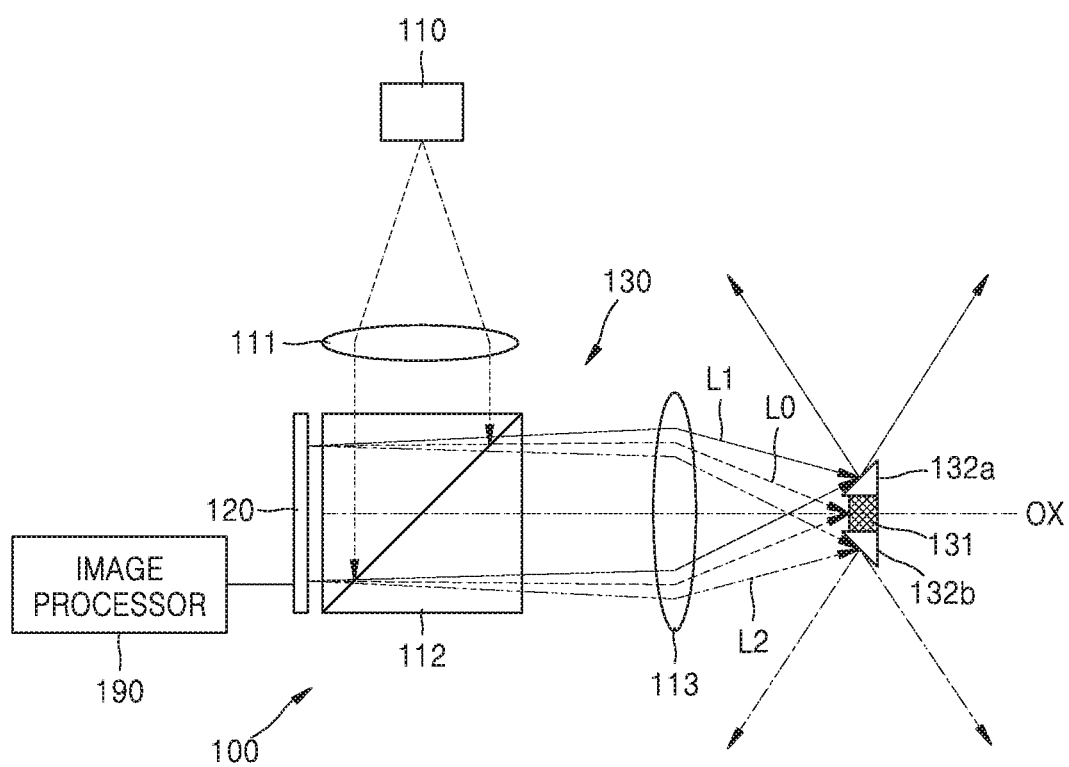
FIG. 1 illustrates a configuration of a multi-image display apparatus according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a multi-image display apparatus using a holographic projection scheme will be described in detail with reference to the accompanying drawings. In the drawings, the sizes of elements may be exaggerated for clarity of illustration. Example embodiments described herein are for illustrative purposes only, and various modifications may be made therefrom. In the following description, when an element is referred to as being "above" or "on" another element in a layered structure, it may be directly on an upper, lower, left, or right side of the other element while making contact with the other element or may be above an upper, lower, left, or right side of the other element without making contact with the other element.

FIG. 1 illustrates a configuration of a multi-image display apparatus 100 according to an example embodiment. Referring to FIG. 1, the multi-image display apparatus 100 according to the example embodiment may include a light source 110 that emits illumination light, a display panel 120 that generates an image by using the illumination light, an optical system 130 configured to transmit the illumination light to the display panel 120 and to transmit an image to an observer, and an image processor 190 configured to provide image data to the display panel 120.

According to the example embodiment, one display panel 120 displays at least two images, which travel in different directions, by using a holographic projection scheme. In addition, the optical system 130 may be configured to separate the at least two images displayed on one display panel 120 and guide them along different paths. In addition, the image processor 190 generates image data and provides the image data to the display panel 120 to cause one display panel 120 to display at least two images traveling in different directions. Then, the multi-image display apparatus 100 may provide an image to each of the observer's left and right eyes with only one display panel 120, express multiple depths, extend a viewing angle, expand the field of view, or produce a foveated image including a sharpened center and a blurred periphery.

To this end, the image processor 190 generates composite image data by applying a phase profile, which determines a direction in which each image will travel, to image data including information of different images. For example, FIG. 2 illustrates a process of generating image data to be provided to one display panel 120 of the multi-image display apparatus 100 when simultaneously displaying two two-dimensional (2D) images.

Figure 2:
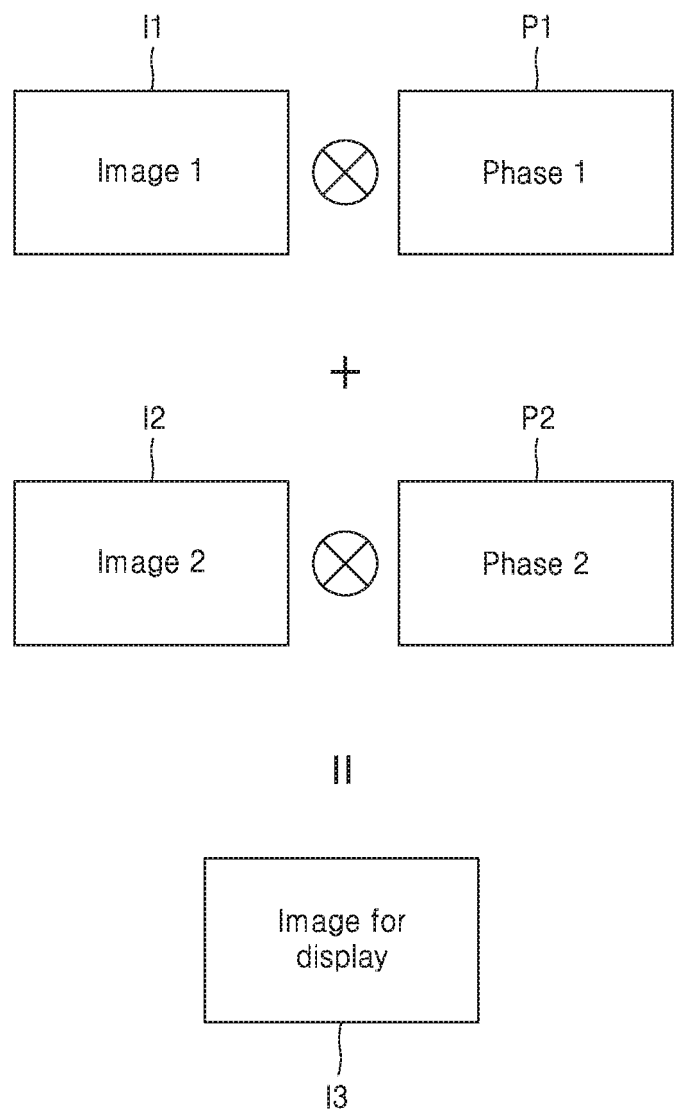
FIG. 2 illustrates a process of generating image data to be provided to one display panel of a multi-image display apparatus when simultaneously displaying two two-dimensional (2D) images.

Referring to FIG. 2, the image processor 190 applies a first phase profile P1, which determines a direction in which a first image travels, to first image data I1 including information of the first image. For example, the image processor 190 may perform a convolution operation on the first phase profile P1 and the first image data I1. In addition, the image processor 190 may perform a convolution operation on second image data I2 including information of a second image and a second phase profile P2 that determines a direction in which the second image travels. Thereafter, the image processor 190 may add the two convolution-processed image data and provide a final synthesized image data 13 to the display panel 120. In this case, adding the two image data may be simply adding corresponding pixel values of the two image data to each other.

Thus, the display panel 120 may simultaneously display the first image and the second image, which are 2D images. The first phase profile P1 and the second phase profile P2 include data forming a prism pattern in the form of a periodic sinusoidal wave. Light is refracted in a certain direction by the prism pattern, and the angle at which the light is refracted is determined by the period of the prism pattern. Therefore, paths through which the first image and the second image travel, respectively, are determined by the image processor 190 according to the periods of the first phase profile P1 and the second phase profile P2 applied to the first image data 11 and the second image data 12, respectively. In the example embodiment, since the period of the first phase profile P1 and the period of the second phase profile P2 are different from each other, the first image and the second image, which are displayed by the display panel 120, may travel in different directions.

Figure 3:
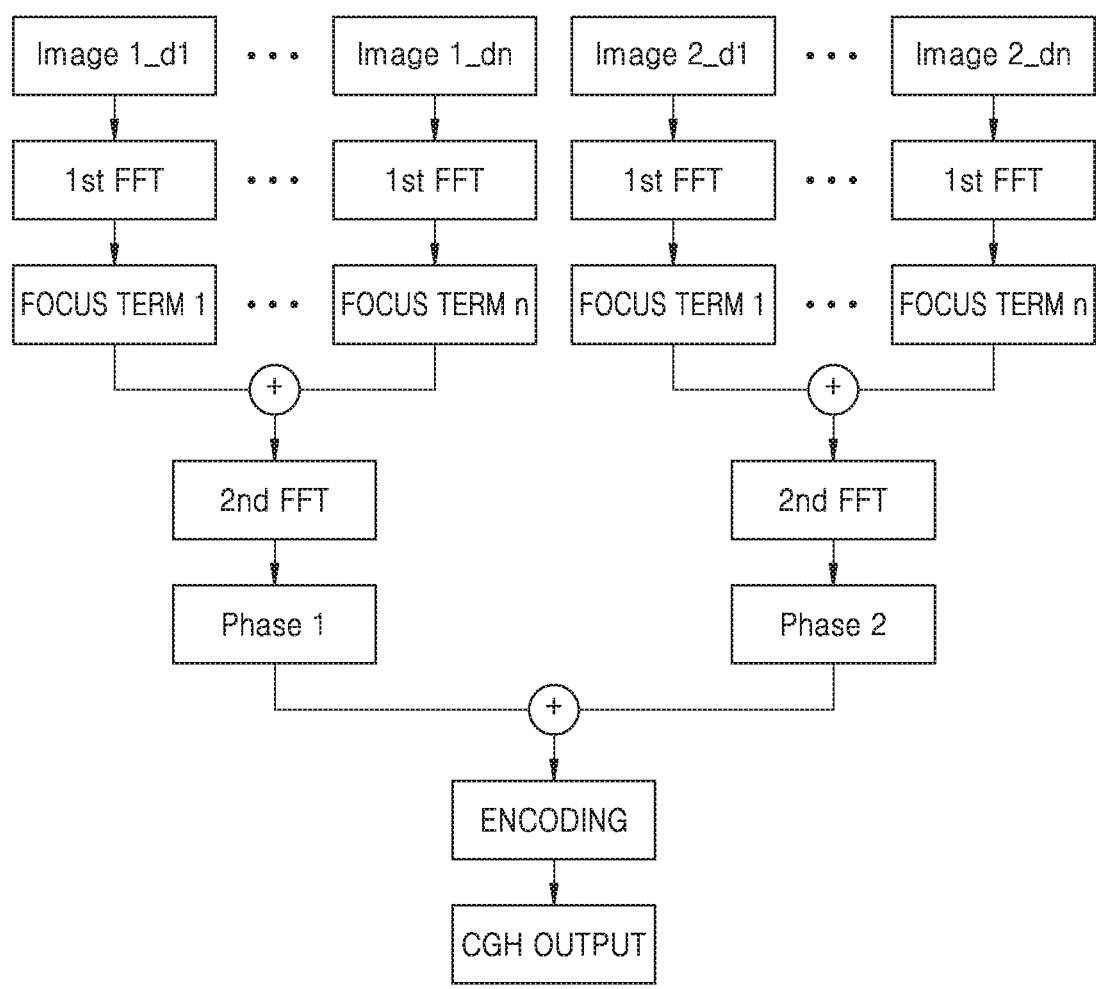
FIG. 3 illustrates a process of generating image data to be provided to one display panel of a multi-image display apparatus when simultaneously displaying two holographic images.

Since the multi-image display apparatus 100 uses a holographic projection scheme, the multi-image display apparatus 100 may reproduce not only at least two 2D images but also at least two three-dimensional (3D) holographic images. For example, FIG. 3 illustrates a process of generating image data to be provided to one display panel 120 of the multi-image display apparatus 100 when simultaneously displaying two holographic images. Referring to FIG. 3, the image processor 190 may convert input image data by using a layer-based algorithm. The layer-based algorithm is a method of dividing a reproduction region of a hologram into a plurality of planar layers based on depth and processing data of each of the planar layers.

First, the image processor 190 may perform Fourier Transform or Fast Fourier Transform (FFT) on a plurality of 2D image data Image 1_d1, . . . , Image 1_dn each including information about a plurality of planar layers obtained by dividing a first image. The image processor 190 may convert image data into complex image data having a complex value through the FFT. A Fourier operation performed in this case is the first Inverse Fourier Transform (IFT) or the first Inverse Fast Fourier Transform (IFFT) from the observer's retina to the observer's pupil. For example, a wavefront of light formed on the observer's retina may be converted into a wavefront formed on the observer's pupil, through the first Fourier operation. In addition, the image processor 190 may also perform Fourier Transform or FFT on a plurality of 2D image data Image 2_d1, . . . , Image 2_dn each including information about a plurality of planar layers obtained by dividing a second image.

Thereafter, the image processor 190 may perform a focus term operation or a lens phase operation by using depth information about the plurality of planar layers obtained by dividing the first image. The lens phase operation is an operation of performing frequency filtering after multiplying final data obtained by performing the first Fourier operation by a depth value. For example, a depth value multiplied by final data obtained by performing the first Fourier operation on image data of a layer may indicate a position in the depth direction of the layer. Thereafter, the image processor 190 may merge a plurality of 2D image data separated by layers obtained by performing a lens phase operation and may generate one image data having all depth information. In addition, the image processor 190 may perform a focus term operation or a lens phase operation by using depth information about the plurality of planar layers obtained by dividing the second image, and may merge the plurality of 2D image data separated by layers.

Thereafter, the image processor 190 may perform the second Fourier operation on one image data including all of the depth information. The second Fourier operation is the second IFT or the second FFT from the observer's pupil to the plane of the display panel 120. For example, the wavefront of light formed in the observer's pupil may be converted into the wavefront of light emitted from the surface of the display panel 120, through the second Fourier operation. The image processor 190 may perform the second Fourier operation on each of the first image and the second image. As a result, two second Fourier-operated complex image data may be generated.

In addition, the image processor 190 may perform a prism phase computation, to adjust a direction in which a holographic image travels. For example, the image processor 190 may apply phase profiles having different periods to two complex image data obtained through the second Fourier operation, such that a first holographic image and a second holographic image travel in different directions. The image processor 190 then may add the two complex image data to which different phase profiles are respectively applied and generate complex image data synthesized as one piece of data.

Finally, the image processor 190 may perform pixel encoding on the complex image data synthesized as one piece of data and finally generate computer-generated hologram (CGH) data to be input to the display panel 120. For example, the image processor 190 may encode complex values respectively corresponding to pixels of the display panel 120 in the complex image data synthesized as one piece of data into integer values. For example, the image processor 190 may encode complex values of the complex image data synthesized as one piece of data into n bit unsigned integer values. Here, n is a natural number. For example, if each pixel of the display panel 120 may represent 256 gray values from 0 to 255, the image processor 190 may encode complex values of the complex image data into 8-bit unsigned integer values. Thereafter, the image processor 190 may output final CGH data obtained through pixel encoding and provide the final CGH data to the display panel 120.

Referring to FIG. 1, since the holographic projection scheme is used, the light source 110 may be a coherent light source that emits coherent light. In order to provide light with high coherence, a laser diode (LD) may be used as the light source 110. In addition, the light source 110 may be a light-emitting diode (LED). The light-emitting diode has lower spatial coherence than lasers, but may be sufficiently diffracted by the display panel 120 when light has only some spatial coherence. In addition to the LED, any light source may be used as the light source 110 as long as it emits light having spatial coherence.

In addition, in the example embodiment illustrated in FIG. 1, the light source 110 may be a point light source that emits divergent light. Although a point light source such as an LED or LD may be directly arranged at the position of the light source 110 shown in FIG. 1, the point light source may be arranged elsewhere and transmit light through an optical fiber. For example, an optical fiber end may be arranged at the position of the light source 110 shown in FIG. 1. In addition, although FIG. 1 illustrates only one light source 110, the light source 110 may include an array of a plurality of LDs or LEDs that provide red light, green light, and blue light, respectively.

The display panel 120 may display an image based on image data provided from the image processor 190. For example, when the image processor 190 provides image data for a 2D image, the display panel 120 displays the 2D image. When the image processor 190 provides CGH data for a holographic image, the display panel 120 displays a hologram pattern. The display panel 120 may include a plurality of display pixels two-dimensionally arranged to display a 2D image or a hologram pattern. The display panel 120 may use any one of a phase modulator capable of performing only phase modulation, an amplitude modulator capable of performing only amplitude modulation, and a complex modulator capable of performing both phase modulation and amplitude modulation. In addition, the display panel 120 may include a reflective spatial light modulator that reflects illumination light to form an image, or a transmissive spatial light modulator that transmits illumination light to form an image. For example, the display panel 120 may use a semiconductor modulator, a liquid crystal device (LCD), a digital micromirror device (DMD), a liquid crystal on silicon (LCoS), or the like.

The image processor 190 may be configured to generate image data and provide the image data to the display panel 120, in the manner described with reference to FIG. 2 or 3, and to control the operation of the light source 110. For example, the image processor 190 may control the lighting and turning off of the light source 110. The image processor 190 may be implemented using software, or may be implemented in the form of a semiconductor chip in which the functions of such software are embedded.

The optical system 130 may be configured to separate at least two images displayed on the display panel 120 and guide them to different paths. The optical system 130 may be variously configured according to the size, purpose, and shape of the multi-image display apparatus 100. For example, when the display panel 120 is configured as a reflective spatial light modulator, the optical system 130 may include a Fourier lens 113 for focusing an image, a beam splitter 112 configured to provide the display panel 120 with illumination light emitted from the light source 110 and provide the Fourier lens 113 with an image generated by the display panel 120, and a collimating lens 111 for collimating illumination light emitted from the light source 110 and incident on the beam splitter 112 into parallel light.

In this configuration, the illumination light emitted from the light source 110 may pass through the collimating lens 111 and then be reflected by the beam splitter 112 to be incident on the display panel 120. Thereafter, the display panel 120 may reproduce at least two images by reflecting and modulating the illumination light. For example, when the display panel 120 generates two images, for example, the first image L1 and the second image L2, the first image L1 and the second image L2 may pass through the beam splitter 112 and then be focused by the Fourier lens 113. As described above, since phase profiles applied to two image data are different from each other, traveling directions of the first image L1 and the second image L2 may be slightly different. Therefore, a position where the first image L1 is focused by the Fourier lens 113 and a position where the second image L2 is focused may be slightly different.

In order to completely separate the first image L1 and the second image L2 and provide the first image L1 and the second image L2 to the observer, the optical system 130 may include appropriate image transfer units arranged respectively at the position where the first image L1 is focused and at the position where the second image L2 is focused. For example, the optical system 130 may include an inclined first mirror 132a arranged at the position where the first image L1 is focused and an inclined second mirror 132b arranged at the position where the second image L2 is focused. Therefore, the Fourier lens 113 may focus the first image L1 on the first mirror 132a and the second image L2 on the second mirror 132b. The first mirror 132a may reflect the first image L1 in a first direction, and the second mirror 132b may reflect the second image L2 in a second direction different from the first direction. Then, the first image L1 and the second image L2 may be completely separated from each other, and then the first image L1 and the second image L2 may be provided to the observer and used in various ways according to the purpose of the multi-image display apparatus 100.

Since the display panel 120 is composed of an array of a plurality of display pixels, a physical array structure of the plurality of display pixels also acts as a diffraction lattice. Therefore, some of the illumination light may be diffracted and interfered by a regular diffraction lattice composed of the array of the display pixels of the display panel 120. As a result, lattice spots may appear on the focal plane of the Fourier lens 113. For example, zero-order diffracted light L0 that does not form an image may travel along an optical axis OX of the Fourier lens 113. The lattice spots may act as image noise, which degrades the image quality of a reproduced image and makes the viewing of the image uncomfortable.

Therefore, the optical system 130 may further include a light shielding member 131 for blocking zero-order diffracted light L0 generated by zero-order diffraction in the display panel 120 such that lattice spot noises are not visible to the observer. For example, the light shielding member 131 may be arranged on the optical axis OX of the Fourier lens 113. In particular, in order to ensure that the first image L1 and the second image L2 are separated from the zero-order diffracted light L0 and the size of the light shielding member 131 is reduced, the light shielding member 131 may be arranged on the focal plane of the Fourier lens 113.

In FIG. 1, the first image L1 and the second image L2 travels obliquely along both sides of the zero-order diffracted light L0, respectively. In this case, the first mirror 132a and the second mirror 132b may be arranged on both sides of the light shielding member 131 in the focal plane of the Fourier lens 113, respectively. However, embodiments are not limited thereto, and directions in which the first image L1 and the second image L2 travel may vary depending on the period of a phase profile applied to image data. The positions of the first mirror 132a and the second mirror 132b may be adjusted according to the focal positions of the first image L1 and the second image L2.

Figure 4:
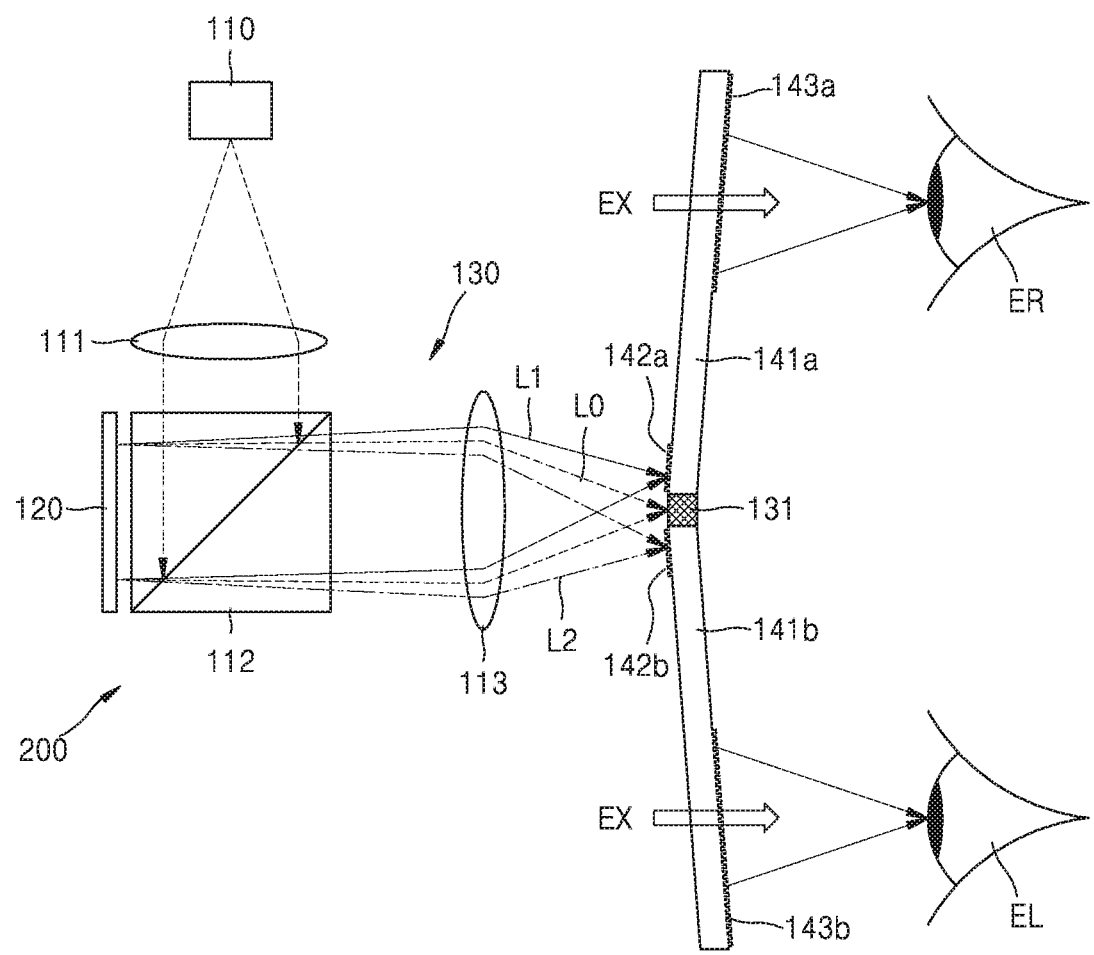
FIG. 4 illustrates a configuration of a multi-image display apparatus according to another example embodiment.

FIG. 4 illustrates a configuration of a multi-image display apparatus 200 according to another example embodiment. Compared to the multi-image display apparatus 100 shown in FIG. 1, only an image transfer unit of the multi-image display apparatus 200 shown in FIG. 4 is different from that of the multi-image display apparatus 100. For example, referring to FIG. 4, an optical system 130 may include a first light guide plate 141a for guiding a first image L1 to a first space and a second light guide plate 141b for guiding a second image L2 to a second space different from the first space. The first light guide plate 141a may include a first input coupler 142a for guiding the first image L1 to the inside of the first light guide plate 141a, and a first output coupler 143a for outputting the first image L1 to the outside of the first light guide plate 141a. In addition, the second light guide plate 141b may include a second input coupler 142b for guiding the second image L2 to the inside of the second light guide plate 141b, and a second output coupler 143b for outputting the second image L2 to the outside of the second light guide plate 141b. The first input coupler 142a and the second input coupler 142b and the first output coupler 143a and the second output coupler 143b may include periodic fine grating patterns and may control the direction of light at various angles depending on the periods, sizes, and shapes of the grating patterns.

The first light guide plate 141a and the second light guide plate 141b are arranged at both sides of the light shielding member 131, respectively. In particular, the first light guide plate 141a and the second light guide plate 141b may be arranged such that an optical waveguide therein extends in a direction substantially perpendicular to an optical axis of a Fourier lens 113. Arrangement directions of the first light guide plate 141a and the second light guide plate 141b may not be completely perpendicular to the optical axis of the Fourier lens 113. The arrangement directions of the first light guide plate 141a and the second light guide plate 141b may be adjusted according to directions in which the first image L1 and the second image L2 respectively output from the first output coupler 143a and the second output coupler 143b will travel.

In addition, the first input coupler 142a is arranged at a position where the first image L1 is focused by the Fourier lens 113 on a first surface of the first light guide plate 141a, and the second input coupler 142b is arranged at a position where the second image L2 is focused by the Fourier lens 113 on a first surface of the second light guide plate 141b. For example, the first input coupler 142a and the second input coupler 142b may be arranged adjacent to both sides of the light shielding member 131, respectively. The first output coupler 143a is arranged on a second surface of the first light guide plate 141a which faces the first surface of the first light guide plate 141a, and the second output coupler 143b is arranged on a second surface of the second light guide plate 141b which faces the first surface of the second light guide plate 141b. In order that the viewing windows of the first image L1 and the second image L2 to be output are sufficiently large, an area of the first output coupler 143a may be larger than an area of the first input coupler 142a, and an area of the second output coupler 143b may be larger than an area of the second input coupler 142b.

In this configuration, the first image L1 displayed on the display panel 120 may travel inside the first light guide plate 141a through the first input coupler 142a. In addition, the first image L1 may be output to the outside of the first light guide plate 141a through the first output coupler 143a and be incident on, for example, a right eye ER of the observer. In addition, the second image L2 displayed on the display panel 120 may travel inside the second light guide plate 141b through the second input coupler 142b. Thereafter, the second image L2 may be output to the outside of the second light guide plate 141b through the second output coupler 143b and may be incident on, for example, a left eye EL of the observer. Therefore, the multi-image display apparatus 200 may provide a right eye image and a left eye image to the observer by using the single display panel 120.

The first output coupler 143a and the second output coupler 143b may diffract only light obliquely incident at a certain angle set in advance and the diffracted light travels perpendicularly to the second surface of the first light guide plate 141a and the second surface of the second light guide plate 141b, respectively. However, the first output coupler 143a and the second output coupler 143b may not act as diffraction grating for light incident at angles other than the certain angle. For example, light from the outside perpendicularly incident onto the first output coupler 143a and the second output coupler 143b passes through the first output coupler 143a and the second output coupler 143b as it is. Therefore, the multi-image display apparatus 200 according to the example embodiment may be used to implement augmented reality (AR) or mixed reality (MR). In this case, the multi-image display apparatus 200 according to the example embodiment may be a near-eye AR display apparatus. For example, in the right eye ER of the observer, the first image L1 reproduced by the display panel 120 and external light EX including an external foreground which is vertically transmitted through the first output coupler 143*a* may be seen together. The external light EX is not an artificial image generated by being modulated by a separate spatial light modulator or displayed by a separate display panel, but contains an actual foreground present in front of the observer. Therefore, the observer may simultaneously recognize both the first image L1, which is an artificially generated virtual image, and the actual foreground. In addition, in the left eye EL of the observer, the second image L2 reproduced by the display panel 120 and the external light EX including the external foreground which is vertically transmitted through the second output coupler 143*b* may be seen together. As such, since the multi-image display apparatus 200 may implement AR for both eyes by using a single display panel 120, the multi-image display apparatus 200 may be manufactured in a smaller size and may have lower power consumption.

Figure 5:
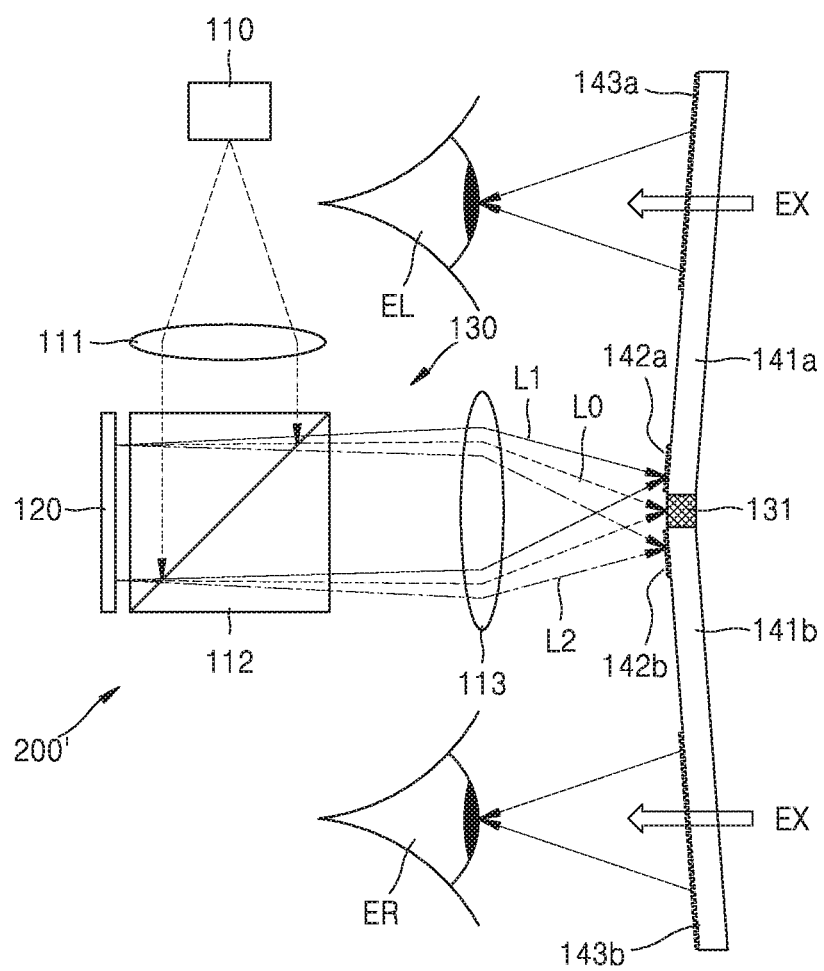
FIG. 5 illustrates a configuration of a multi-image display apparatus according to another example embodiment.

FIG. 5 illustrates a configuration of a multi-image display apparatus 200' according to another example embodiment. Although the first output coupler 143*a* and the second output coupler 143*b* of the multi-image display apparatus 200 shown in FIG. 4 are arranged in different directions with respect to the first input coupler 142*a* and the second input coupler 142*b*, the first output coupler 143*a* and the second output coupler 143*b* may be arranged in the same direction with respect to the first input coupler 142*a* and the second input coupler 142*b*, as shown in FIG. 5. For example, the first input coupler 142*a* and the first output coupler 143*a* may be arranged together on the first surface of the first light guide plate 141*a*, and the second input coupler 142*b* and the second output coupler 143*b* may be arranged together on the first surface of the second light guide plate 141*b*. In this case, the first image L1 output through the first output coupler 143*a* may be incident on the left eye EL of the observer, and the second image L2 output through the second input coupler 142*b* may be incident on the right eye ER of the observer.

Figure 6:
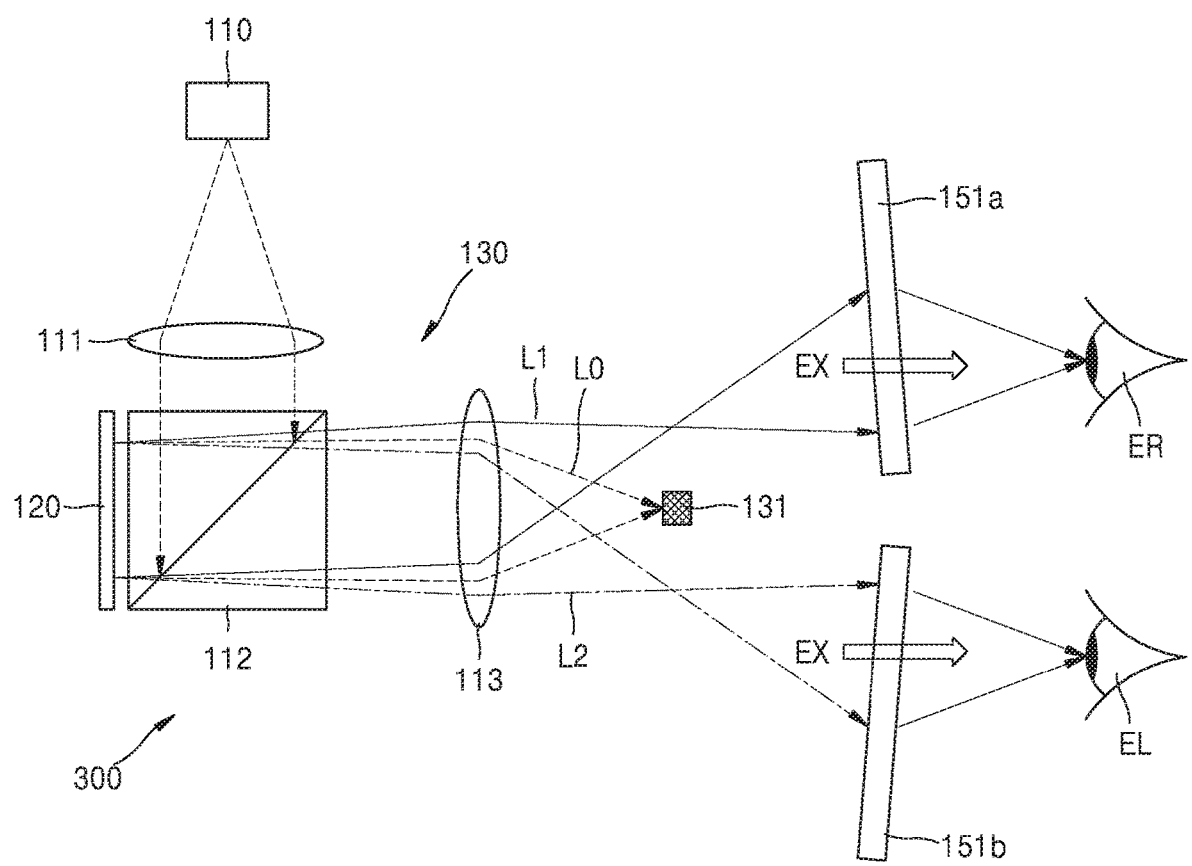
FIG. 6 illustrates a configuration of a multi-image display apparatus according to another example embodiment.

FIG. 6 illustrates a configuration of a multi-image display apparatus 300 according to another example embodiment. The multi-image display apparatus 300 shown in FIG. 6 may include an optical member, which changes a traveling direction of light incident at a certain angle to transmit the light, as an image transfer unit. Referring to FIG. 6, an optical system 130 may include a first optical member 151*a* for transmitting a first image L1 to a first space and a second optical member 151*b* for transmitting a second image L2 to a second space different from the first space. For example, the first optical member 151*a* and the second optical member 151*b* may include holographic optical elements (HOE).

Each of the HOEs may be formed by making reference light and object light interfere with each other in a photosensitive layer. For example, an interference pattern, which is formed by making reference light be incident on a photosensitive layer in the same direction as the direction of a first image L1 incident on the first optical member 151*a* and making object light be incident on the photosensitive layer in the same direction as the direction of a first image L1 passing through the first optical member 151*a*, may be recorded in the HOE. When a first image L1 in the same direction as the reference light is incident on the first optical member 151*a* including the HOE, the first image L1 has the same direction as the object light when the first image L1 passes through the first optical member 151*a*. In addition, an interference pattern, which is formed by making reference light be incident on a photosensitive layer in the same direction as the direction of a second image L2 incident on the second optical member 151*b* and making object light be incident on the photosensitive layer in the same direction as the direction of a second image L2 passing through the second optical member 151*b*, may be recorded in the HOE. When a second image L2 in the same direction as the reference light is incident on the second optical member 151*b* including the HOE, the second image L2 has the same direction as the object light when the second image L2 passes through the second optical member 151*b*. Instead, the HOE may be designed to transmit light incident in a certain direction in a different direction by using a 3D array of fine patterns having different refractive indices.

The first optical member 151*a* and the second optical member 151*b* may be arranged in opposite directions at both sides of a light shielding member 131, respectively. In particular, the first optical member 151*a* and the second optical member 151*b* may be arranged such that the light incident surfaces thereof extend in a direction substantially perpendicular to the optical axis of a Fourier lens 113. In addition, the first optical member 151*a* and the second optical member 151*b* may be arranged farther than the focal length of the Fourier lens 113 from the Fourier lens 131. Then, the first image L1 and the second image L2 may be enlarged while passing through the focus of the Fourier lens 113 and be incident on large areas of the light incident surfaces of the first optical member 151*a* and the second optical member 151*b*, respectively.

In this configuration, the first image L1 displayed on the display panel 120 is incident on the first optical member 151*a* after passing through the Fourier lens 113. The first image L1 may be refracted while passing through the first optical member 151*a* and be incident on the right eye ER of the observer. In addition, the second image L2 displayed on the display panel 120 is incident on the second optical member 151*b* after passing through the Fourier lens 113. The second image L2 may be refracted while passing through the second optical member 151*b* and be incident on the left eye EL of the observer. In addition, light incident perpendicularly to the first optical member 151*a* and the second optical member 151*b* passes through the first optical member 151*a* and the second optical member 151*b* as they are. Therefore, the observer may view the first image L1 and the second image L2 together with external light EX including an external foreground.

Figure 7:
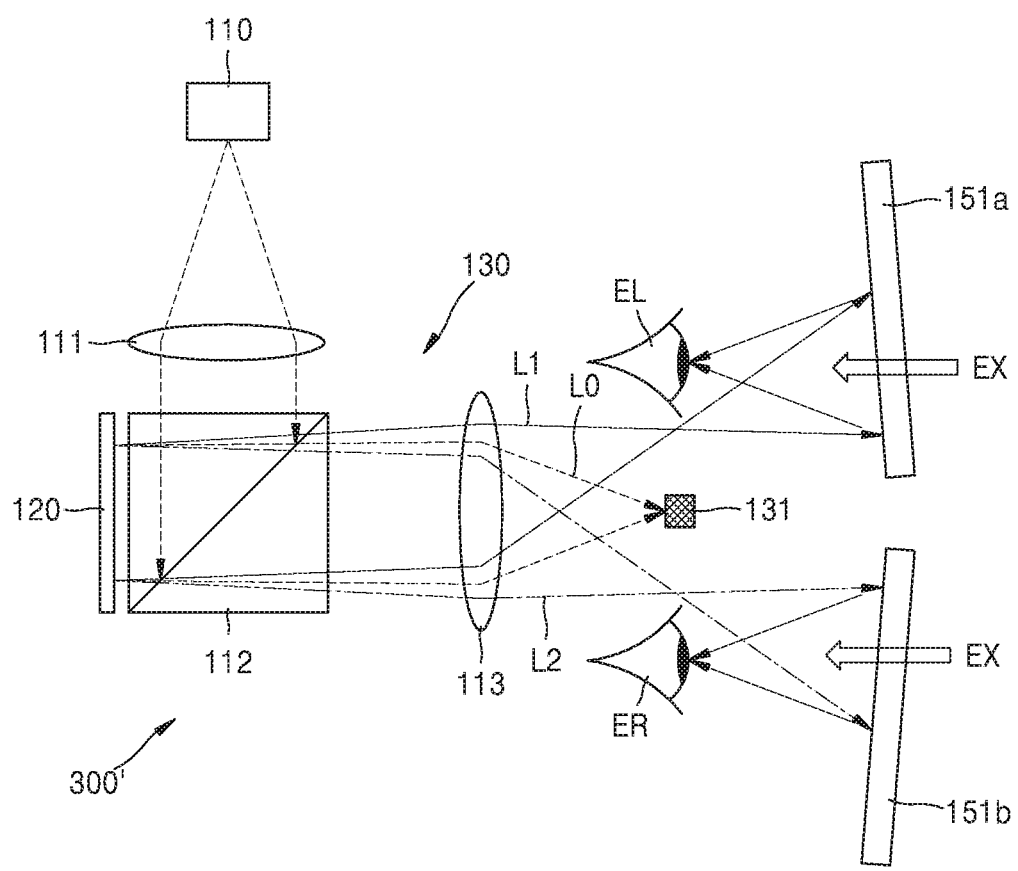
FIG. 7 illustrates a configuration of a multi-image display apparatus according to another example embodiment.

FIG. 7 illustrates a configuration of a multi-image display apparatus 300' according to another example embodiment. In the multi-image display apparatus 300' shown in FIG. 7, first optical member 151*a* and the second optical member 151*b* may be configured to reflect a first image L1 and a second image L2. For example, the first optical member 151*a* and the second optical member 151*b* may include semi-transmissive mirrors that transmit a portion of incident light and reflect another portion of the incident light, or may include HOEs that change a traveling direction of light incident at a certain angle to reflect the light. In this case, the first image L1 reflected by the first optical member 151*a* may be incident on the left eye EL of the observer, and the second image L2 reflected by the second optical member 151*b* may be incident on the right eye ER of the observer.

Figure 8:
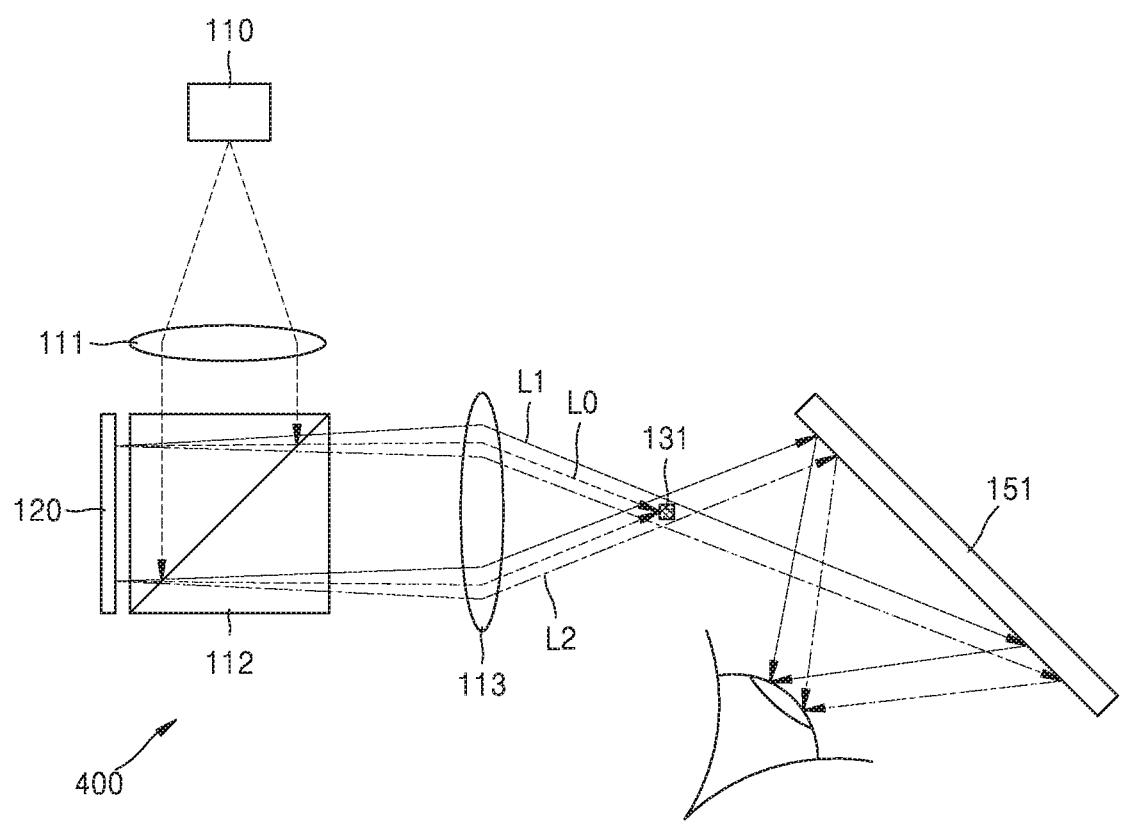
FIG. 8 illustrates a configuration of a multi-image display apparatus according to another example embodiment.

FIG. 8 illustrates a configuration of a multi-image display apparatus 400 according to another example embodiment. Referring to FIG. 8, the multi-image display apparatus 400 may include one optical member 151, which reflects both a first image L1 and a second image L2, as an image transfer unit. To this end, traveling directions of the first image L1 and the second image L2, the position of an optical member 151, and the refractive power of a Fourier lens 113 may be appropriately selected. For example, the image processor 190 may determine a phase profile for the first image L1 and a phase profile for the second image L2 such that both the first image L1 and the second image L2 may be incident on one optical member 151.

Figure 9:
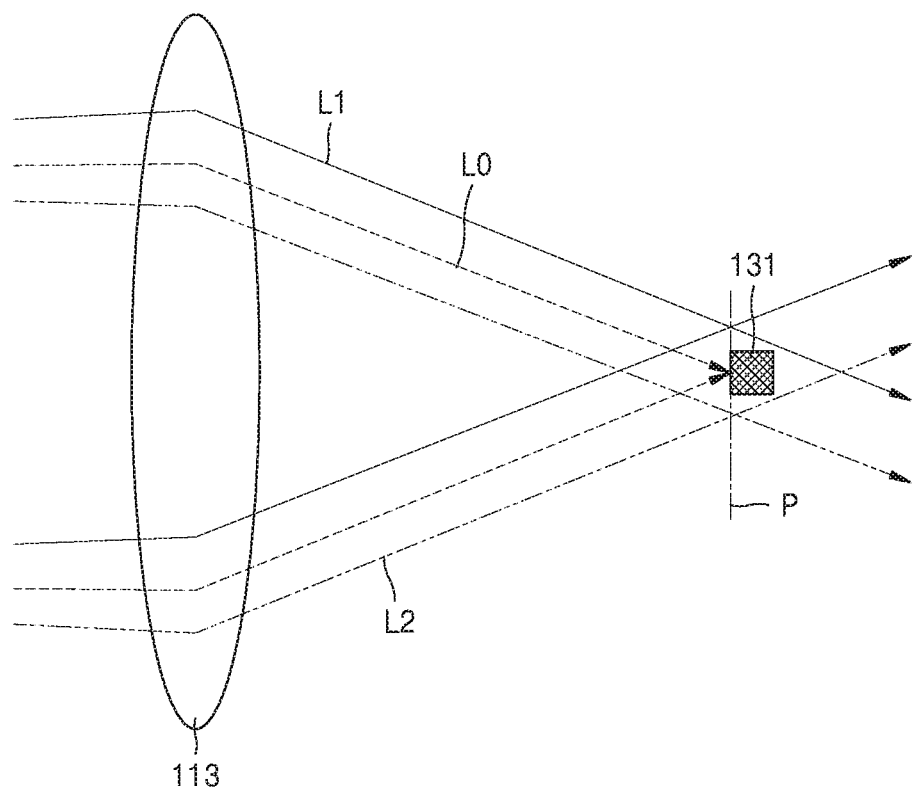
FIG. 9 is an enlarged view of a Fourier lens and a light shielding member in FIG. 8.

FIG. 9 is an enlarged view of the Fourier lens 113 and a light shielding member 131 in FIG. 8. Referring to FIG. 9, the first image L1 and the second image L2 are focused by the Fourier lens 113 on the same focal plane P as zero-order diffracted light L0. Although the difference between a traveling direction of the first image L1 and a traveling direction of the second image L2 is not large, the focal point of the first image L1 and the focal point of the second image L2 may be arranged in opposite directions at both sides of the light shielding member 131, respectively. The light shielding member 131 may have a relatively small size substantially equal to that of a spot of the zero-order diffracted light L0 to not block the first image L1 and the second image L2.

Referring back to FIG. 8, the optical member 151 may be arranged farther than the focal length of the Fourier lens 113 from the Fourier lens 113. The first image L1 and the second image L2 may be enlarged while passing through the focus of the Fourier lens 113 and be incident on a large area of the light incident surface of the optical member 151. When incident on the optical member 151, the first image L1 and the second image L2 may be shifted with respect to each other. Therefore, the first image L1 and the second image L2 reflected by the optical member 151 may be shifted with respect to each other even at the position where the observer views the first image L1 and the second image L2.

In this configuration, the image processor 190 may generate image data for the first image L1 and image data for the second image L2 by using image data of different viewpoints and provide the generated image data to the display panel 120. The first image L1 and the second image L2 displayed by the display panel 120 may have different viewpoint information. Since the first image L1 and the second image L2 shifted from each other have different viewpoint information, when the observer's eye position moves, the viewpoint of an image viewed by the observer may change. Therefore, the multi-image display apparatus 400 may provide an extended field of view, and the observer may observe an image in a wider area.

Figure 10:
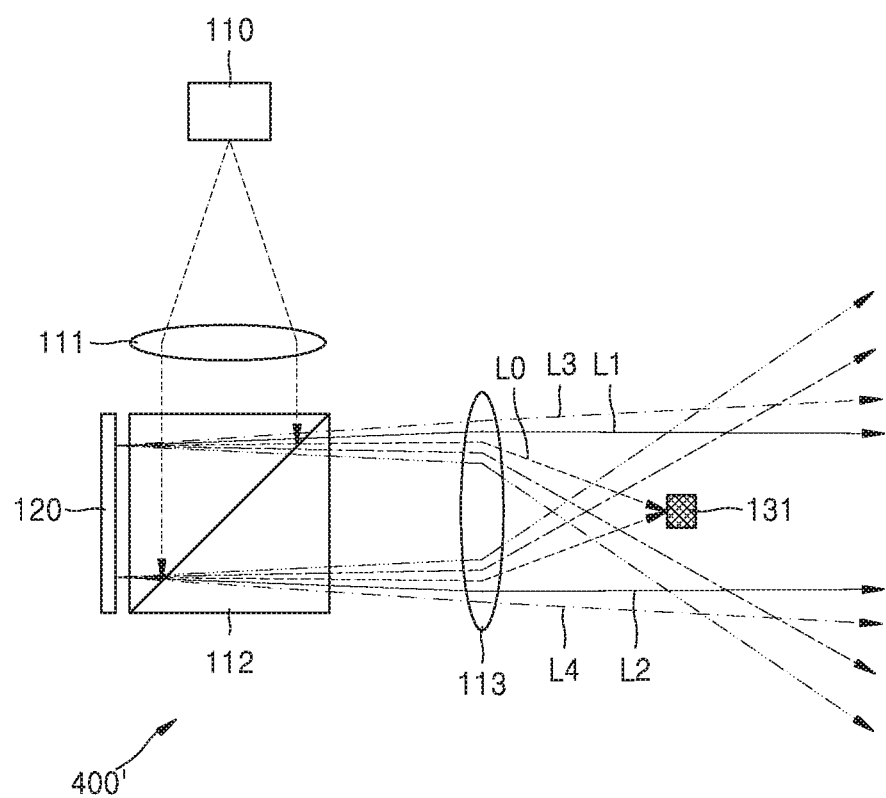
FIG. 10 illustrates a configuration of a multi-image display apparatus according to another example embodiment.

FIG. 10 illustrates a configuration of a multi-image display apparatus 400' according to another example embodiment. In the example embodiment shown in FIG. 10, a display panel 120 simultaneously displays four images L1 to L4 traveling in different directions. For example, the image processor 190 may generate composite image data obtained by adding the first image data to fourth image data to which different first phase profile to fourth phase profile are applied, respectively, and provide the composite image data to the display panel 120. In addition, the first image L1 and a third image L3 may travel along a first side of the zero-order diffracted light L0, and the second image L2 and a fourth image L4 may travel along a second side opposite to the first side of the zero-order diffracted light L0. The first image L1, the second image L2, the third image L3, and the fourth image L4 are focused by the Fourier lens 113 on the same focal plane P as the zero-order diffracted light L0. The light shielding member 131 may be located at the focal point of the zero-order diffracted light L0, the focal points of the first image L1 and the third image L3 may be located on a first side of the light shielding member 131, and the focal points of the second image L2 and the fourth image L4 may be located on a second side opposite to the first side of the light shielding member 131.

In this configuration, the first image L1 and the third image L3 may be projected on the first space. The second image L2 and the fourth image L4 may be projected on a second space different from the first space. The first image L1 and the third image L3 may be shifted with respect to each other at a position where the observer views the first image L1 and the third image L3. In addition, the second image L2 and the fourth image L4 may be shifted with respect to each other at the position where the observer views the second image L2 and the fourth image L4. In this case, the first image L1 and the third image L3 may be images for the right eye of the observer, which have different viewpoint information, and the second image L2 and the fourth image L4 may be images for the left eye of the observer, which have different viewpoint information. Therefore, when the position of the observer's eyes moves, the viewpoint of an image viewed by the observer may change.

Figure 11:
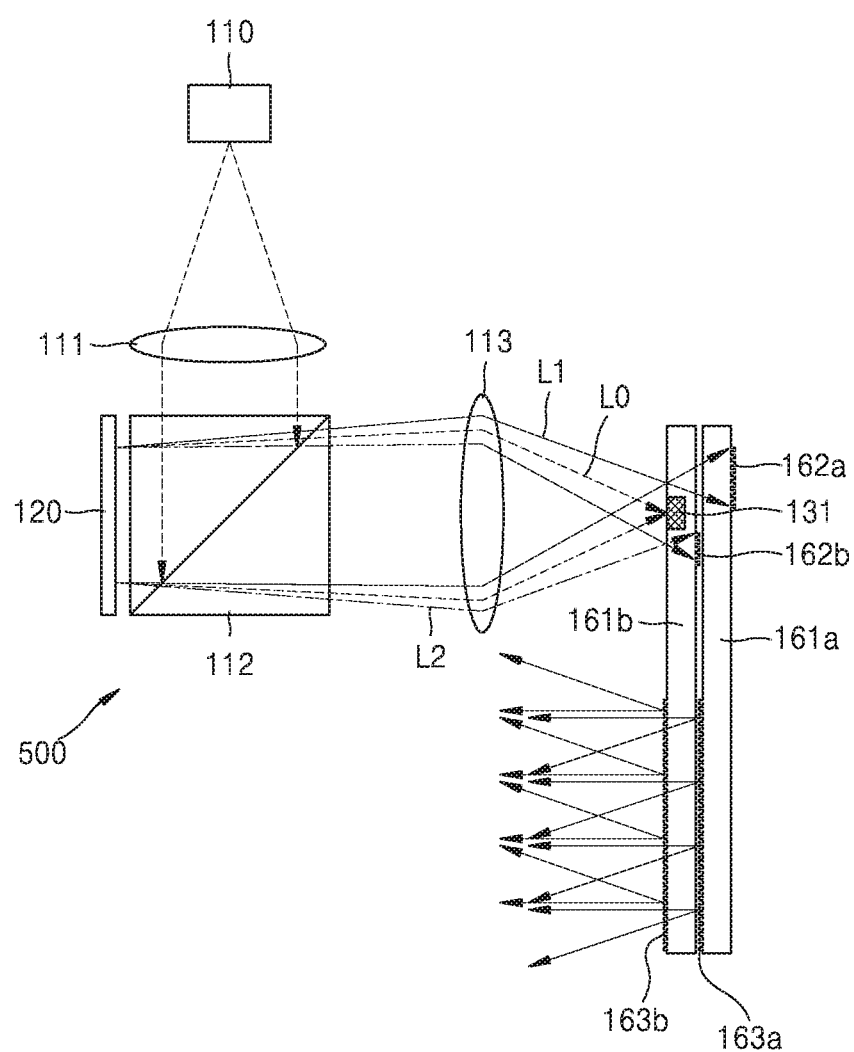
FIG. 11 illustrates a configuration of a multi-image display apparatus according to another example embodiment.

FIG. 11 illustrates a configuration of a multi-image display apparatus 500 according to another example embodiment. Referring to FIG. 11, the multi-image display apparatus 500 according to the example embodiment may include a first light guide plate 161a and a second light guide plate 161b, as image transfer units, which guide images in different angle ranges in the same space. For example, the first light guide plate 161a may be configured to guide the first image L1 at a first angle range into a space, and the second light guide plate 161b may be configured to guide the second image L2 in a second angle range different from the first angle range into the space.

The first light guide plate 161a includes a first input coupler 162a for guiding the first image L1 to the inside of the first light guide plate 161a, and a first output coupler 163a for outputting the first image L1 to the outside of the first light guide plate 161a. The second light guide plate 161b includes a second input coupler 162b for guiding the second image L2 to the inside of the second light guide plate 161b, and a second output coupler 163b for outputting the second image L2 to the outside of the second light guide plate 161b. The second light guide plate 161b is arranged on the first light guide plate 161a in a direction in which light is emitted. Therefore, the first output coupler 163a and the second output coupler 163b overlap each other, and the first image L1 output through the first output coupler 163a of the first light guide plate 161a passes through the second output coupler 163b of the second light guide plate 161b. On the other hand, the first input coupler 162a and the second input coupler 162b are arranged not to face each other such that the first image L1 is incident only on the first input coupler 162a and the second image L2 is incident only on the second input coupler 162b.

The first image L1 and the second image L2 are focused by a Fourier lens 113 on the same focal plane P as zero-order diffracted light L0. A light shielding member 131 is located at the focal point of the zero-order diffracted light L0, and the focal points of the first image L1 and the second image L2 are located at opposite sides of the light shielding member 131, respectively. The second light guide plate 161b may be arranged on the focal plane P of the Fourier lens 113. Then, the second input coupler 162b of the second light guide plate 161b is located at the focal point of the second image L2. The first input coupler 162a of the first light guide plate 161a may be arranged slightly farther from the Fourier lens 113 than the focal point of the first image L1.

In this configuration, the first light guide plate 161a and the second light guide plate 161b may provide the first image L1 and the second image L2, respectively, in different angle ranges in the same space. In particular, the image processor 190 may synthesize image data such that the first angle range of the first image L1 and the second angle range of the second image L2 are continuous with each other without overlapping each other. For example, when the normal direction of a light exit surface of the first light guide plate 161a is 0 degrees, the first angle range may be about −40 degrees to about 0 degrees and the second angle range may be about 0 degrees to about +40 degrees. Then, a viewing angle may be doubled than that obtained with only one image. Thus, the observer may observe images of a wider angle range.

Figure 12:
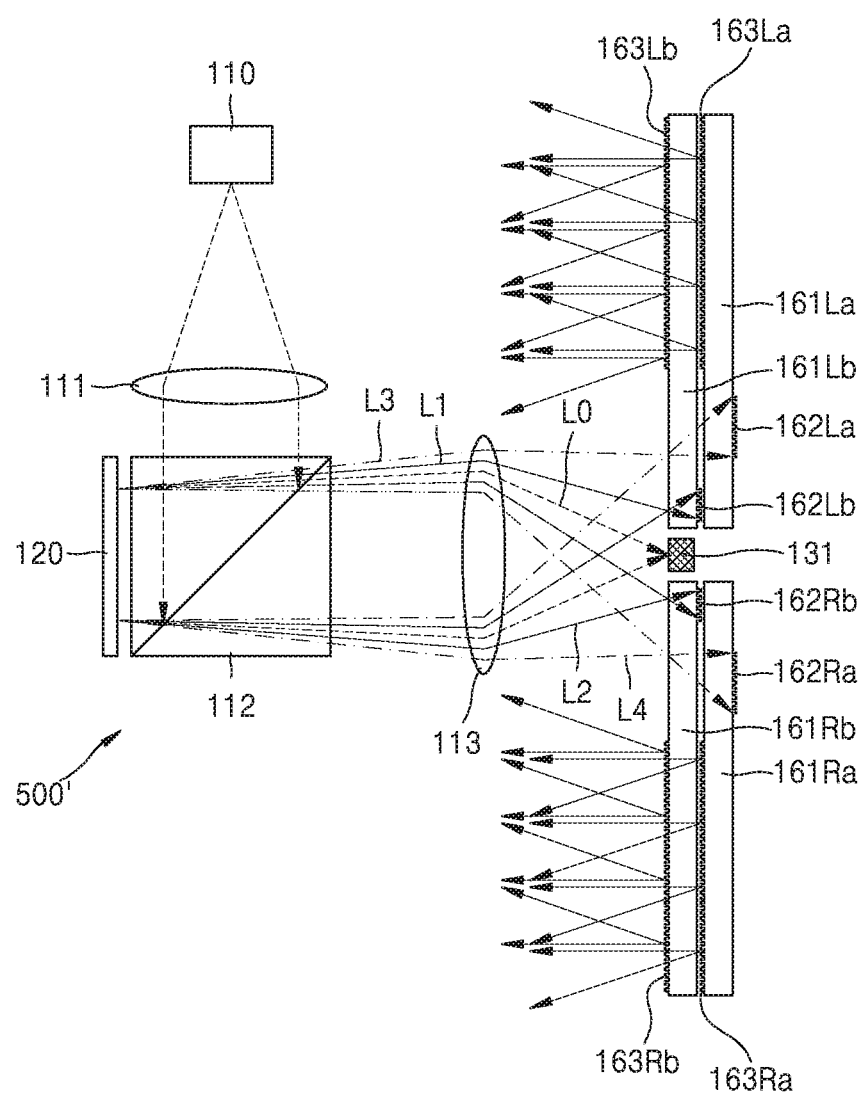
FIG. 12 illustrates a configuration of a multi-image display apparatus according to another example embodiment.

FIG. 12 illustrates a configuration of a multi-image display apparatus 500' according to another example embodiment. Referring to FIG. 12, a display panel 120 simultaneously displays a first image L1, a second image L2, a third image L3, and a fourth image L4 traveling in different directions. For example, the first image L1 and the third image L3 may travel along a first side of a zero-order diffracted light L0, and the second image L2 and the fourth image L4 may travel along a second side opposite to the first side of the zero-order diffracted light L0. The first image L1, the second image L2, the third image L3, and the fourth image L4 are focused by the Fourier lens 113 on the same focal plane P as the zero-order diffracted light L0. The light shielding member 131 may be located at the focal point of the zero-order diffracted light L0, the focal points of the first image L1 and the third image L3 may be located on a first side of the light shielding member 131, and the focal points of the second image L2 and the fourth image L4 may be located on a second side opposite to the first side of the light shielding member 131.

The multi-image display apparatus 500' shown in FIG. 12 may include, as image transfer units, a first light guide plate 161La for guiding the first image L1 into a first space in a first angle range, a second light guide plate 161 Ra for guiding the second image L2 into a second space different from the first space in the first angle range, a third light guide plate 161Lb for guiding the third image L3 into the first space in a second angle range different from the first angle range, and a fourth light guide plate 161Rb for guiding the fourth image L4 into the second space in the second angle range. For example, the first light guide plate 161La and the third light guide plate 161Lb are arranged on the first side of the light shielding member 131, and the second light guide plate 161Ra and the fourth light guide plate 161Rb are arranged on the second side opposite to the first side of the light shielding member 131. In addition, the third light guide plate 161Lb and the fourth light guide plate 161Rb may be arranged on the focal plane P of the Fourier lens 113.

Also, the first light guide plate 161La includes a first input coupler 162La for guiding the first image L1 to the inside of the first light guide plate 161La, and a first output coupler 163La for outputting the first image L1 to the outside of the first light guide plate 161La. The second light guide plate 161Ra includes a second input coupler 162Ra for guiding the second image L2 to the inside of the second light guide plate 161Ra, and a second output coupler 163Ra for outputting the second image L2 to the outside of the second light guide plate 161Ra. The third light guide plate 161Lb includes a third input coupler 162Lb for guiding the third image L3 to the inside of the third light guide plate 161Lb, and a third output coupler 163Lb for outputting the third image L3 to the outside of the third light guide plate 161Lb. The fourth light guide plate 161Rb includes a fourth input coupler 162Rb for guiding the fourth image L4 to the inside of the fourth light guide plate 161Rb, and a fourth output coupler 163Rb for outputting the fourth image L4 to the outside of the fourth light guide plate 161Rb.

The third light guide plate 161Lb is arranged on the first light guide plate 161La in a direction in which light is emitted. Therefore, the first output coupler 163La and the third output coupler 163Lb overlap each other, and the first image L1 output through the first output coupler 163La of the first light guide plate 161La passes through the third output coupler 163Lb of the third light guide plate 161Lb. In addition, the fourth light guide plate 161Rb is arranged on the second light guide plate 161Ra in a direction in which light is emitted. Therefore, the second output coupler 163Ra and the fourth output coupler 163Rb overlap each other, and the second image L2 output through the second output coupler 163Ra of the second light guide plate 161Ra passes through the fourth output coupler 163Rb of the fourth light guide plate 161 Rb.

In this case, the first image L1 and the third image L3 may be images for the left eye of the observer, which have different viewing angle information, and the second image L2 and the fourth image L4 may be images for the right eye of the observer, which have different viewing angle information. For example, the first light guide plate 161La and the third light guide plate 161Lb may provide the first image L1 and the third image L3 in an angle range in which the first image L1 and the third image L3 do not overlap each other in the same first space and are continuously connected to each other. In addition, the second light guide plate 161Ra and the fourth light guide plate 161Rb may provide the second image L2 and the fourth image L4 in an angle range in which the second image L2 and the fourth image L4 do not overlap each other in the same second space and are continuously connected to each other. Then, the multi-image display apparatus 500' may provide the observer with a left eye image and a right eye image, each of which has an extended viewing angle.

Figure 13:
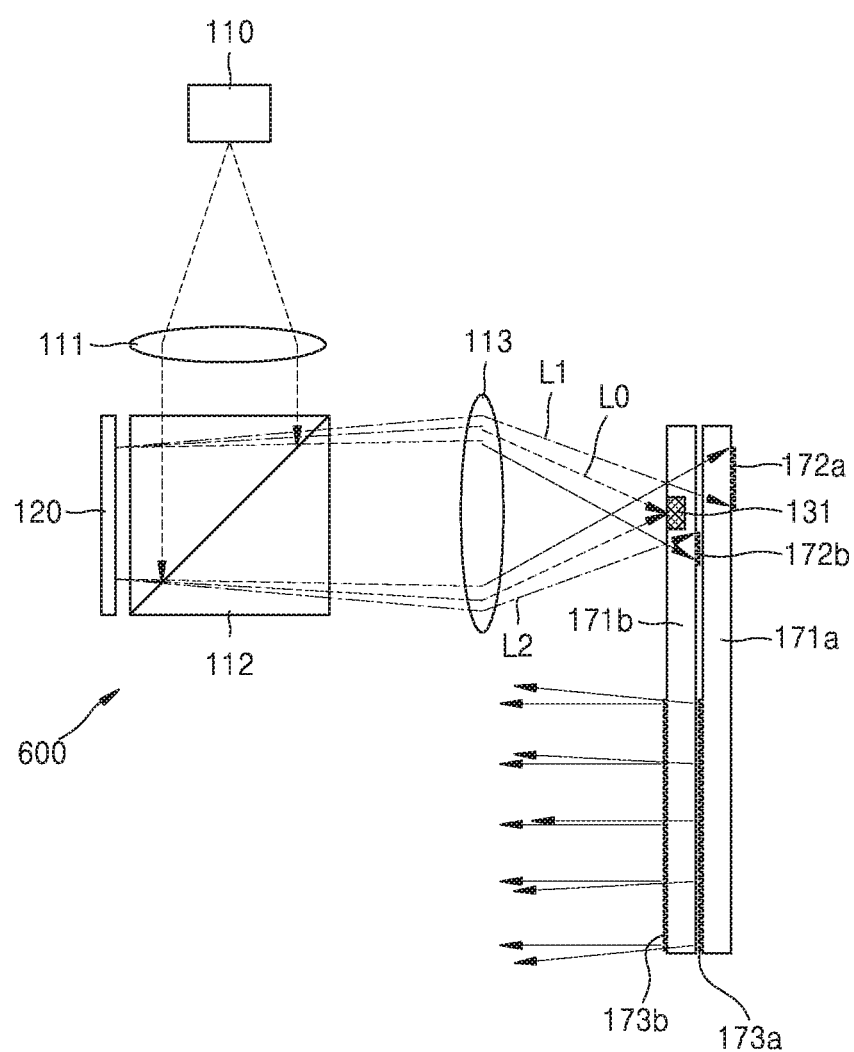
FIG. 13 is a schematic view illustrating a configuration of a multi-image display apparatus according to another example embodiment.

FIG. 13 illustrates a configuration of a multi-image display apparatus 600 according to another example embodiment. The multi-image display apparatus 600 shown in FIG. 13 may include a first light guide plate 171a and a second light guide plate 171b, which project images at different depths on the same space, as image transfer units. For example, the first light guide plate 171a may be configured to project the first image L1 at a first depth on a space, and the second light guide plate 171b may be configured to project the second image L2 into the space at a second depth different from the first depth.

The first light guide plate 171a includes a first input coupler 172a for guiding the first image L1 to the inside of the first light guide plate 171a, and a first output coupler 173a for outputting the first image L1 to the outside of the first light guide plate 171a. The second light guide plate 171b includes a second input coupler 172b for guiding the second image L2 to the inside of the second light guide plate 171b, and a second output coupler 173b for outputting the second image L2 to the outside of the second light guide plate 171b. The second light guide plate 171b is arranged on the first light guide plate 171a in a direction in which light is emitted. Therefore, the first output coupler 173a and the second output coupler 173b overlap each other, and the first image L1 output through the first output coupler 173a of the first light guide plate 171a passes through the second output coupler 173b of the second light guide plate 171b.

The first image L1 and the second image L2 are focused by a Fourier lens 113 on the same focal plane P as zero-order diffracted light L0. A light shielding member 131 is located at the focal point of the zero-order diffracted light L0, and the focal points of the first image L1 and the second image L2 are located at opposite sides of the light shielding member 131, respectively. The second light guide plate 171b may be arranged on the focal plane P of the Fourier lens 113. Then, the second input coupler 172b of the second light guide plate 171b is located at the focal point of the second image L2. The first input coupler 172a of the first light guide plate 171a may be arranged slightly farther from the Fourier lens 113 than the focal point of the first image L1.

In order for the first image L1 and the second image L2 to be projected at different depths, the angle at which the first image L1 output by the first output coupler 173a of the first light guide plate 171a converges may be different from the angle at which the second image L2 output by the second output coupler 173b of the second light guide plate 171b converges. For example, the convergence angle of the first image L1 may be greater than the convergence angle of the second image L2. To this end, the structures of periodic grating patterns constituting the first output coupler 173a and the second output coupler 173b may be differently selected.

Figure 14:
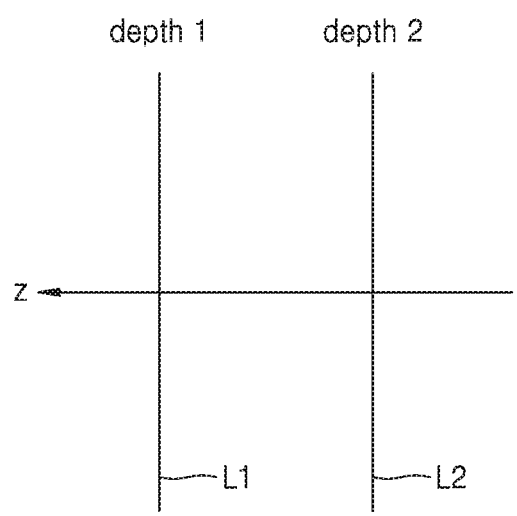
FIG. 14 illustrates the depth of an image represented by the multi-image display apparatus shown in FIG. 13 when displaying two 2D images.
Figure 15:
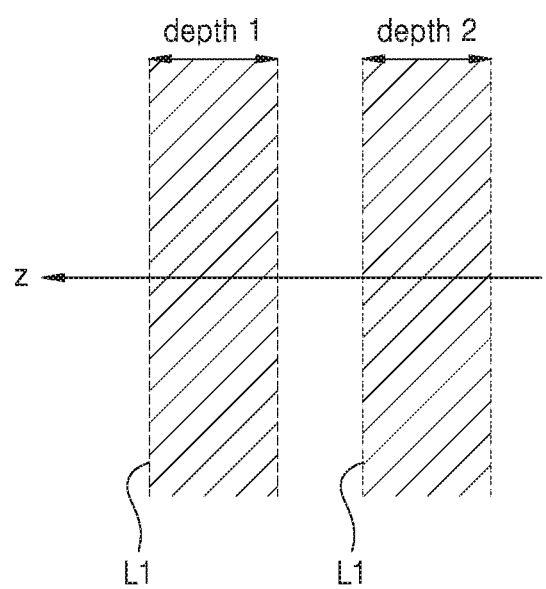
FIG. 15 illustrates a depth range of an image represented by the multi-image display apparatus shown in FIG. 13 when displaying two holographic images.

FIG. 14 illustrates the depth of an image represented by the multi-image display apparatus 600 shown in FIG. 13 when displaying two 2D images, and FIG. 15 illustrates a depth range of an image represented by the multi-image display apparatus 600 shown in FIG. 13 when displaying two holographic images. Referring to FIG. 14, when the multi-image display apparatus 600 displays two 2D images, the observer may determine that the first image L1 is at a first depth and the second image L2 is at a second depth. In addition, when the multi-image display apparatus 600 displays two holographic images, the observer may determine that the first image L1 has a first depth range and the second image L2 has a second depth range. Therefore, a depth range, which is wider than a depth range represented by only one holographic image, may be represented.

Figure 16:
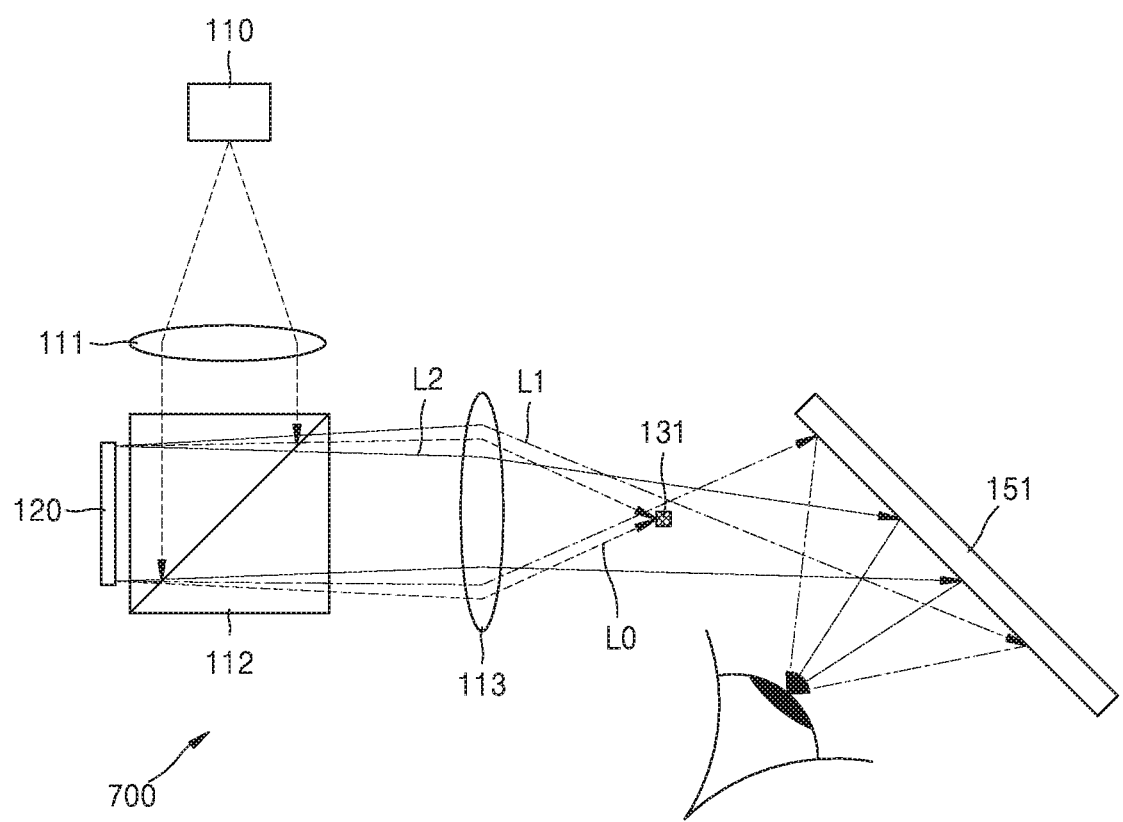
FIG. 16 illustrates a configuration of a multi-image display apparatus according to another example embodiment.

FIG. 16 illustrates a configuration of a multi-image display apparatus 700 according to another example embodiment. The configuration of the multi-image display apparatus 700 illustrated in FIG. 16 is similar to that of the multi-image display apparatus 400 illustrated in FIG. 8, and there is a difference therebetween in that a focal length at which a first image L1 is focused by a Fourier lens 113 is different from a focal length at which a second image L2 is focused by the Fourier lens 113.

For example, in the example embodiment shown in FIG. 16, the focal length for the first image L1 is equal to the focal length for zero-order diffracted light L0, and the focal length for the second image L2 is greater than the focal length for the zero-order diffracted light L0. For example, the focal length for the first image L1 may be less than the distance between a display panel 120 and an optical member 151, and the focal length for the second image L2 may be greater than the distance between the display panel 120 and the optical member 151. To this end, the image processor 190 may determine a phase profile for the second image L2 such that the second image L2 displayed on the display panel 120 is asymmetrically incident on a center portion of the Fourier lens 113. In addition, the image processor 190 may determine the phase profile for the second image L2 such that the beam width of the second image L2 is less than the beam width of the first image L1 at the light incident surface of the Fourier lens 113. In addition, the image processor 190 may determine a phase profile for the first image L1 such that the first image L1 is symmetrically incident on the Fourier lens 113 while forming substantially parallel rays.

Then, the first image L1 is incident on the optical member 151 while diverging after passing a focal point. Then, the first image L1 is reflected by the optical member 151 and converged again at a point. In addition, the second image L2 is reflected by the optical member 151 and converged at a point. In this case, the first image L1 and the second image L2 may be converged at the same point. To this end, the optical member 151 may reflect the first image L1 and the second image L2 while changing traveling angles of the first image L1 and the second image L2 such that light incident in the direction of the first image L1 and light incident in the direction of the second image L2 are converged at the same point. For example, the optical member 151 may be an HOE manufactured to reflect light incident at a certain angle at a different angle.

In this configuration, when viewed by the observer, the second image L2 is located at the center of the first image L1 and the first image L1 surrounds the periphery of the second image L2. In addition, since the angle of view of the second image L2 at the center is narrower than that of the first image L1, the second image L2 is sharper and has a higher resolution than the first image L1. Since the first image L1 spreads wider than the second image L2, the sharpness and resolution of the first image L1 are lower than those of the second image L2. Therefore, when the first image L1 and the second image L2 are combined into one image, the center of the field of vision of the obtained image may be clearer and the periphery thereof may be blurrier as seen by the real eye. As such, a foveated image may be implemented using a single display panel 120. In particular, since a central image and a peripheral image are displayed by a single display panel 120, the color characteristics of the central image and the color characteristics of the peripheral image may be the same, thereby providing a more natural foveated image.

Figure 17:
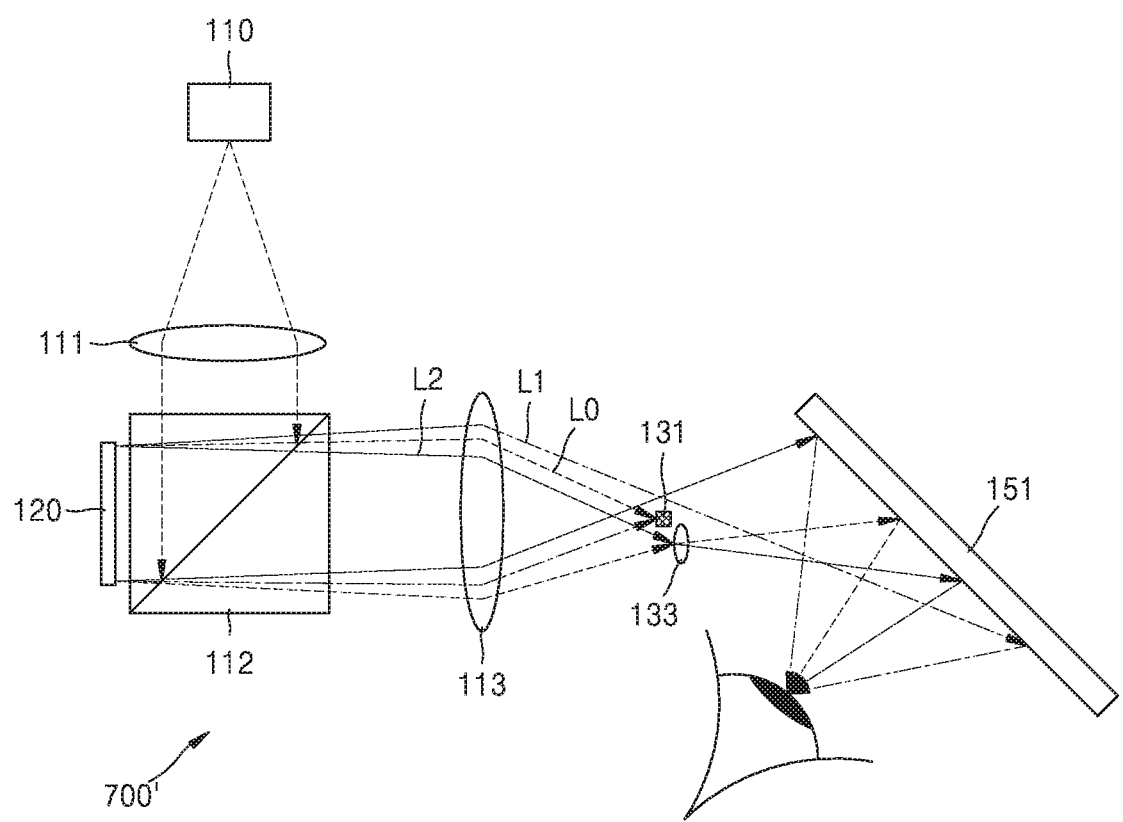
FIG. 17 illustrates a configuration of a multi-image display apparatus according to another example embodiment.

In addition, FIG. 17 illustrates a configuration of a multi-image display apparatus 700' according to another example embodiment. Referring to FIG. 17, the configuration of the multi-image display apparatus 700' is similar to the configuration of the multi-image display apparatus 400 shown in FIG. 8, and a first image L1 and a second image L2 are focused by a Fourier lens 113 on the same focal plane as zero-order diffracted light L0. Although the difference between a traveling direction of the first image L1 and a traveling direction of the second image L2 is not large, the focal point of the first image L1 and the focal point of the second image L2, which are formed by the Fourier lens 113, may be arranged in opposite directions at both sides of a light shielding member 131, respectively. The light shielding member 131 may have a relatively small size substantially equal to that of a spot of the zero-order diffracted light L0 to not cover the first image L1 and the second image L2.

The multi-image display apparatus 700' shown in FIG. 17 further includes a lens 133 arranged near the focal point of the second image L2 to reduce the divergence angle of the second image L2. Both the first image L1 and the second image L2 are incident on an optical member 151 while diverging after passing the focal points and the divergence angle of the second image L2 is less than the divergence angle of the first image L1 due to the lens 133. Therefore, the area of a region where the second image L2 is incident on the optical member 151 is smaller than the area of a region where the first image L1 is incident on the optical member 151. For example, on the surface of the optical member 151, the second image L2 is located near the center of the first image L1.

The first image L1 and the second image L2 are reflected by the optical member 151 and converged at the same point.

To this end, the optical member 151 may reflect the first image L1 and the second image L2 while changing traveling angles of the first image L1 and the second image L2 such that light incident in the direction of the first image L1 and light incident in the direction of the second image L2 are converged at the same point. For example, the optical member 151 may be an HOE manufactured to reflect light incident at a certain angle at a different angle.

In this configuration, when viewed by the observer, the second image L2 is located at the center of the first image L1 and the first image L1 surrounds the periphery of the second image L2. In addition, since the angle of view of the second image L2 at the center is narrower than that of the first image L1, the second image L2 is sharper and has a higher resolution than the first image L1. Since the first image L1 spreads wider than the second image L2, the sharpness and resolution of the first image L1 are lower than the sharpness and resolution of the second image L2. Therefore, when the first image L1 and the second image L2 are combined into one image, the center of the field of vision of the obtained image may be clearer and the periphery thereof may be blurrier as seen by the real eye. As such, a foveated image may be implemented using a single display panel 120. In particular, since a central image and a peripheral image are displayed by a single display panel 120, the color characteristics of the central image and the color characteristics of the peripheral image may be the same, thereby providing a more natural foveated image.

Figure 18:
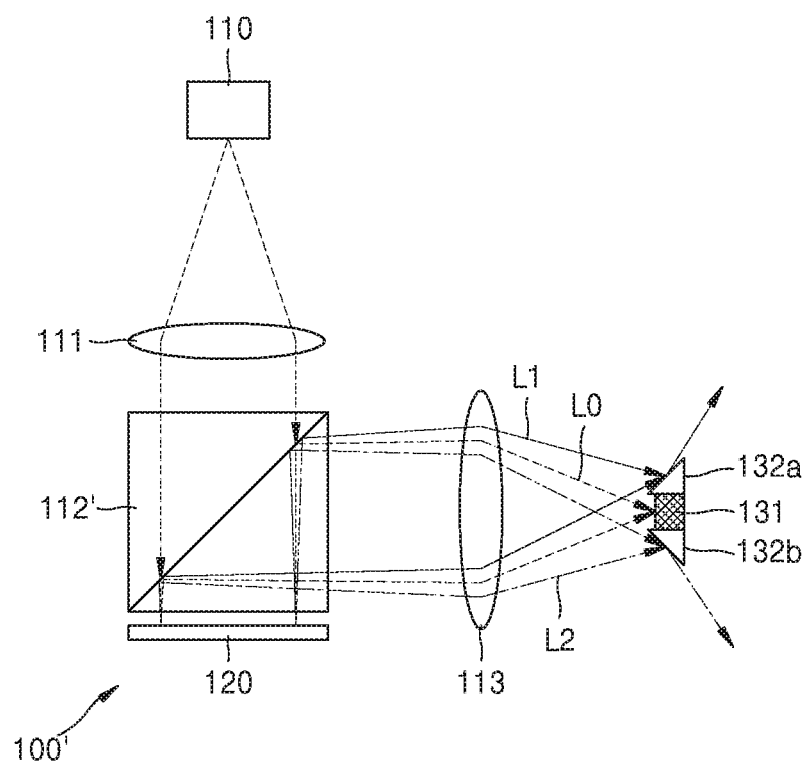
FIG. 18 illustrates a configuration of a multi-image display apparatus according to another example embodiment.

The case where illumination light emitted from the light source 110 is reflected by the beam splitter 112 and light reflected from the display panel 120 passes through the beam splitter 112 has been described above. However, embodiments are not necessarily limited thereto. For example, FIG. 18 is a schematic view illustrating a configuration of a multi-image display apparatus 100' according to another example embodiment. The configuration of the multi-image display apparatus 100' shown in FIG. 18 is similar to that of the multi-image display apparatus 100 shown in FIG. 1, and there is a difference therebetween only in that illumination light emitted from a light source 110 passes through a beam splitter 112' and light reflected from a display panel 120 is reflected by the beam splitter 112'.

The beam splitter 112' may include a semi-transmissive mirror that transmits a portion of incident light and reflects the remaining portion of the incident light. Instead, the beam splitter 112' may include a polarization beam splitter that reflects light having a first linearly polarized component and transmits light having a second linearly polarized component orthogonal to the first linearly polarized component. For example, the light having the second linearly polarized component, of the illumination light emitted from the light source 110, passes through the beam splitter 112' and is incident on the display panel 120. In addition, while the polarization direction of light reflected by the display panel 120 is rotated by 90 degrees, the light has a first linearly polarized component. To this end, a quarter wave plate may be arranged on the light incident surface of the display panel 120. Then, the light having the second linearly polarized component is reflected by the beam splitter 112' and is incident on the Fourier lens 113.

Figure 19:
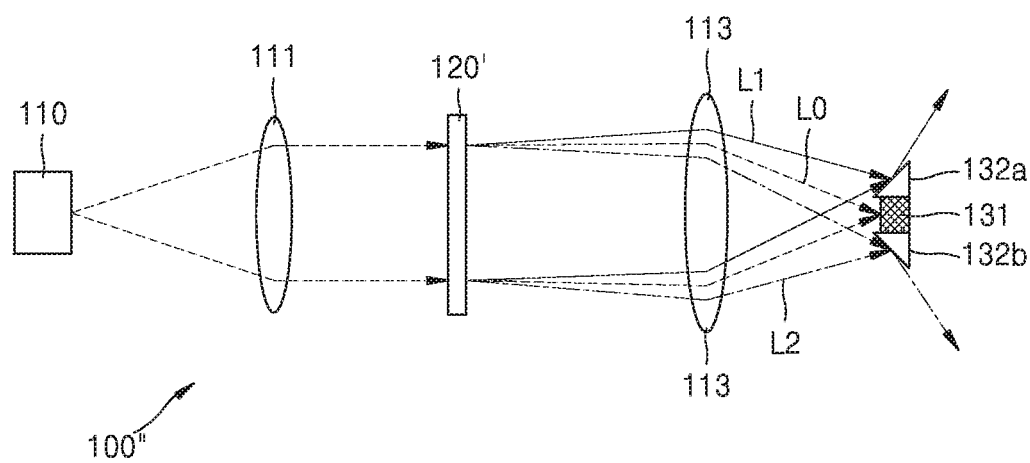
FIG. 19 illustrates a configuration of a multi-image display apparatus according to another example embodiment.

In addition, the case where the display panel 120 is a reflective spatial light modulator has been described above. However, embodiments are not necessarily limited thereto. For example, FIG. 19 is a schematic view illustrating a configuration of a multi-image display apparatus 100" according to another example embodiment. The configuration of the multi-image display apparatus 100" shown in FIG. 19 is similar to that of the multi-image display apparatus 100 shown in FIG. 1, and there is a difference therebetween only in that a display panel 120' is a transmissive spatial light modulator. Referring to FIG. 19, the multi-image display apparatus 100" may include a light source 110, a collimating lens 111, a display panel 120', a Fourier lens 113, a light shielding member 131, a first mirror 132a, and a second mirror 132b. Since the display panel 120' transmits illumination light emitted from the light source 110 to form an image, a beam splitter may be omitted.

Figure 20:
FIGS. 20 and 21 illustrate various electronic devices employing multi-image display apparatuses according to example embodiments.
Figure 21:
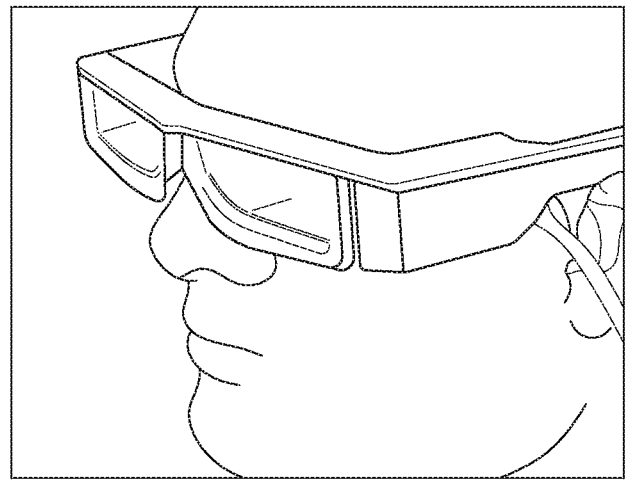

FIGS. 20 and 21 illustrate various electronic devices employing multi-image display apparatuses according to example embodiments. As shown in FIGS. 20 and 21, each of the multi-image display apparatuses may be used as a wearable device. In other words, the multi-image display apparatus may be applied to a wearable device. For example, the multi-image display apparatus may be applied to a head mounted display (HMD). Also, the multi-image display apparatus may be applied to a glasses-type display, a goggle-type display, etc. The wearable electronic devices shown in FIGS. 20 and 21 may be operated in interconnection with a smart phone. The multi-image display apparatus may be a VR display apparatus, an AR display apparatus, or a MR display apparatus of a head-mounted type or a glasses or goggle type capable of providing a virtual reality or providing a virtual image together with an external real image.

Also, the multi-image display apparatus may be included in a smart phone, and the smart phone itself may be used as a multi-image display apparatus. In other words, the multi-image display apparatus may be applied to a small electronic device such as a mobile electronic device other than the wearable device as shown in FIGS. 20 and 21. The application field of the multi-image display apparatus may be variously changed. For example, the multi-image display apparatus may be applied not only to realize a VR, an AR, or a MR, but also to other fields. For example, the multi-image display apparatus may be applied to a small television or a small monitor that may be worn by a user.

While multi-image display apparatuses using a holographic projection scheme are described with reference to the accompanying drawings, it should be understood by those skilled in the art that the example embodiments are capable of various modifications and may be embodied in many different forms.

While example embodiments have been described with reference to the figures, it will be understood by those of ordinary skill in the art that various changes in form and details may be made therein without departing from the spirit and scope of the present disclosure as defined by the following claims.

What is claimed is:
1. A display apparatus comprising:
a light source configured to emit illumination light;
a display panel configured to generate an image based on the illumination light;
an image processor configured to provide image data to the display panel to cause the display panel to generate a first image and a second image which travel in different directions such that the first image and the second image travels along both sides of a zero-order diffracted light generated by zero-order diffraction in the display panel; and
an optical system configured to separate the first image and the second image displayed on the display panel,
wherein the image processor is further configured to provide the display panel with composite image data obtained by adding first image data to which a first phase profile is applied and second image data to which a second phase profile different from the first phase profile is applied, and wherein the optical system comprises a light shielding member configured to block the zero-order diffracted light.

2. The display apparatus of claim 1, wherein the optical system further comprises:
a first mirror configured to reflect the first image in a first direction; and
a second mirror configured to reflect the second image in a second direction that is different from the first direction.

3. The display apparatus of claim 2, wherein the display panel comprises a reflective spatial light modulator configured to generate the image by reflecting the illumination light,
wherein the optical system further comprises:
a Fourier lens configured to focus the first image on the first mirror and the second image on the second mirror;
a beam splitter configured to provide the display panel with the illumination light emitted from the light source and to provide the Fourier lens with the image generated by the display panel; and
a collimating lens configured to collimate the illumination light emitted from the light source and incident on the beam splitter to parallel light.

4. The display apparatus of claim 3, wherein the light shielding member is provided on a focal plane of the Fourier lens on an optical axis of the Fourier lens, and the first mirror and the second mirror are respectively provided on opposite sides of the light shielding member on the focal plane of the Fourier lens.

5. The display apparatus of claim 2, wherein the display panel comprises a transmissive spatial light modulator configured to transmit the illumination light and generate the image,
wherein the optical system further comprises:
a collimating lens configured to collimate the illumination light emitted from the light source and incident on the display panel to parallel light; and
a Fourier lens configured to focus the first image on the first mirror and focus the second image on the second mirror, the Fourier lens being provided to face a light exit surface of the display panel.

6. The display apparatus of claim 1, wherein the optical system comprises:
a first light guide plate configured to guide the first image to a first space; and
a second light guide plate configured to guide the second image to a second space that is different from the first space.

7. The display apparatus of claim 6, wherein the first light guide plate comprises a first input coupler configured to guide the first image to an inside of the first light guide plate, and a first output coupler configured to output the first image from the first light guide plate to an outside of the first light guide plate, and
wherein the second light guide plate comprises a second input coupler configured to guide the second image to an inside of the second light guide plate, and a second output coupler configured to output the second image from the inside of the first light guide plate to an outside of the second light guide plate.

8. The display apparatus of claim 7, wherein the optical system further comprises a Fourier lens configured to focus the first image and the second image, and wherein the first input coupler is provided at a first position where the first image is focused by the Fourier lens, and the second input coupler is provided at a second position where the second image is focused by the Fourier lens.

9. The display apparatus of claim 7, wherein an area of the first output coupler is larger than an area of the first input coupler, and an area of the second output coupler is larger than an area of the second input coupler.

10. The display apparatus of claim 6, wherein the first light guide plate and the second light guide plate are provided on opposite sides of the light shielding member, respectively.

11. The display apparatus of claim 6, wherein the first image is an image for a left eye of an observer and the second image is an image for a right eye of the observer.

12. The display apparatus of claim 1, wherein the optical system comprises:
a first optical member configured to reflect or transmit the first image to a first space; and
a second optical member configured to reflect or transmit the second image to a second space that is different from the first space.

13. The display apparatus of claim 12, wherein the first optical member and the second optical member comprise semi-transmissive mirrors or holographic optical elements.

14. The display apparatus of claim 12, wherein the optical system further comprises a Fourier lens configured to focus the first image and the second image,
wherein the first optical member and the second optical member are provided farther from the Fourier lens than a focal length of the Fourier lens,
wherein the light shielding member is provided on a focal plane of the Fourier lens on an optical axis of the Fourier lens, and
wherein the first optical member and the second optical member are arranged in opposite directions at opposite sides of the light shielding member, respectively.

15. The display apparatus of claim 1, wherein the optical system comprises an optical member configured to reflect or transmit the first image and the second image such that the second image is shifted with respect to the first image.

16. The display apparatus of claim 15, wherein the optical system further comprises a Fourier lens configured to focus the first image and the second image, and
wherein the optical member is provided farther from the Fourier lens than a focal length of the Fourier lens.

17. The display apparatus of claim 15, wherein viewpoint information of the first image is different from viewpoint information of the second image.

18. The display apparatus of claim 1, wherein the optical system comprises:
a first light guide plate configured to guide the first image to a space at a first angle range; and
a second light guide plate configured to guide the second image to a space at a second angle range that is different from the first angle range.

19. The display apparatus of claim 18, wherein the first light guide plate comprises a first input coupler configured to guide the first image to an inside of the first light guide plate, and a first output coupler configured to output the first image from the inside of the first light guide plate to an outside of the first light guide plate,
wherein the second light guide plate comprises a second input coupler configured to guide the second image to an inside of the second light guide plate, and a second output coupler configured to output the second image from the inside of the second light guide plate to an outside of the second light guide plate, and wherein the first output coupler and the second output coupler overlap each other such that the first image output through the first output coupler passes through the second output coupler of the second light guide plate.

20. The display apparatus of claim 19, wherein the first input coupler and the second input coupler are arranged not to overlap each other such that the first image is incident only on the first input coupler and the second image is incident only on the second input coupler.

21. The display apparatus of claim 20, wherein the light shielding member is provided between the first input coupler and the second input coupler.

22. The display apparatus of claim 1, wherein the image processor is further configured to provide the display panel with composite image data obtained by adding third image data to which a third phase profile is applied and fourth image data to which a fourth phase profile is applied to each of the first image data and the second image data,
wherein the third phase profile is different from the first phase profile and the second phase profile, and the fourth phase profile different from the first phase profile, the second phase profile, and the third phase profile; and
wherein the display panel is further configured to generate the first image, the second image, a third image, and a fourth image that travel in different directions.

23. The display apparatus of claim 22, wherein the first image and the third image are images for a right eye of an observer, viewpoint information of the first image being different from viewpoint information of the second image, and
wherein the second image and the fourth image are images for a left eye of the observer, viewpoint information of the second image being different from viewpoint information of the fourth image.

24. The display apparatus of claim 23, wherein the optical system comprises:
a first optical member configured to reflect or transmit the first image and the third image such that the third image is shifted with respect to the first image; and
a second optical member configured to reflect or transmit the second image and the fourth image such that the fourth image is shifted with respect to the second image.

25. The display apparatus of claim 23, wherein the optical system comprises:
a first light guide plate configured to guide the first image to a first space at a first angle range;
a second light guide plate configured to guide the second image to a second space that is different from the first space at the first angle range;
a third light guide plate configured to guide the third image to the first space at a second angle range that is different from the first angle range; and
a fourth light guide plate configured to guide the fourth image to the second space at the second angle range.

26. The display apparatus of claim 25, wherein the first light guide plate comprises a first input coupler configured to guide the first image to an inside of the first light guide plate, and a first output coupler configured to output the first image from the inside of the first light guide plate to an outside of the first light guide plate,
the second light guide plate comprises a second input coupler configured to guide the second image to an inside of the second light guide plate, and a second output coupler configured to output the second image from the inside of the second light guide plate to an outside of the second light guide plate,
the third light guide plate comprises a third input coupler configured to guide the third image to an inside of the third light guide plate, and a third output coupler configured to output the third image from the inside of the third light guide plate to outside of the third light guide plate, and
the fourth light guide plate comprises a fourth input coupler configured to guide the fourth image to an inside of the fourth light guide plate, and a fourth output coupler configured to output the fourth image from the inside of the fourth light guide plate to outside of the fourth light guide plate,
wherein the first output coupler and the third output coupler overlap each other such that the first image output through the first output coupler passes through the third output coupler of the third light guide plate, and
wherein the second output coupler and the fourth output coupler overlap each other such that the second image output through the second output coupler passes through the fourth output coupler of the fourth light guide plate.

27. The display apparatus of claim 25,
wherein the first light guide plate and the third light guide plate are provided on a first side of the light shielding member, and the second light guide plate and the fourth light guide plate are provided on a second side of the light shielding member.

28. The display apparatus of claim 1, wherein the optical system comprises:
a first light guide plate configured to project the first image at a first depth on a space; and
a second light guide plate configured to project the second image at a second depth on the space, the second depth being different from the first depth.

29. The display apparatus of claim 28, wherein the first light guide plate comprises a first input coupler configured to guide the first image to an inside of the first light guide plate, and a first output coupler configured to output the first image from the inside of the first light guide plate to outside of the first light guide plate,
the second light guide plate comprises a second input coupler configured to guide the second image to an inside of the second light guide plate, and a second output coupler configured from the inside of the second light guide plate to output the second image to outside of the second light guide plate, and
wherein the first output coupler and the second output coupler overlap each other such that the first image output through the first output coupler passes through the second output coupler of the second light guide plate.

30. The display apparatus of claim 1, wherein the optical system comprises an optical member configured to reflect or transmit the first image and the second image such that the second image is provided at a center of the first image and the first image is provided to surround a periphery of the second image.

31. The display apparatus of claim 30, wherein the first image and the second image are combined to form a single image,
wherein an angle of view of the second image is smaller than an angle of view of the first image, and wherein a resolution of the second image is higher than a resolution of the first image.

32. The display apparatus of claim 30, wherein the image processor is further configured to generate the first phase profile such that the first image is focused at a first focal length and to generate the second phase profile such that the second image is focused at a second focal length that is greater than the first focal length, and
wherein the first focal length is less than a distance between the display panel and the optical member and the second focal length is greater than the distance between the display panel and the optical member.

33. The display apparatus of claim 1, wherein the optical system further comprises:
a first lens configured to focus the first image and the second image, respectively;
a second lens provided at a focal point of the second image formed by the first lens, the second lens being configured to reduce a divergence angle of the second image; and
an optical member configured to converge the first image and the second image at a same point.

34. The display apparatus of claim 1, wherein the display apparatus comprises a virtual reality display apparatus, an augmented reality display apparatus, or a mixed reality display apparatus, which is configured as a head mounted-type apparatus, a glass-type apparatus, or a goggle-type apparatus.

35. A display apparatus comprising:
a light source configured to emit light;
a display panel configured to generate an image based on the light;
an image processor configured to provide composite image data, obtained by adding first image data to which a first phase profile is applied and second image data to which a second phase profile different from the first phase profile is applied, to the display panel to cause the display panel to simultaneously display a first holographic image that travels in a first direction and a second holographic image that travels in a second direction that is different from the first direction such that the first holographic image and the second holographic image travels along both sides of a zero-order diffracted light generated by zero-order diffraction in the display panel; and
an optical system configured to separate the first holographic image and the second holographic image displayed on the display panel, the optical system comprising a light shielding member configured to block the zero-order diffracted light.

* * * * *